(12) United States Patent
Auchmann

(10) Patent No.: US 12,519,935 B2
(45) Date of Patent: Jan. 6, 2026

(54) METHOD FOR VERIFYING VIDEO DATA ENCODED IN AN ENCODER UNIT

(71) Applicant: Matthias Auchmann, Vienna (AT)

(72) Inventor: Matthias Auchmann, Vienna (AT)

(73) Assignee: Matthias Auchmann, Vienna (AT)

( * ) Notice: Subject to any disclaimer, the term of this patent is extended or adjusted under 35 U.S.C. 154(b) by 0 days.

(21) Appl. No.: 18/528,813

(22) Filed: Dec. 5, 2023

(65) Prior Publication Data
US 2024/0187582 A1  Jun. 6, 2024

(30) Foreign Application Priority Data
Dec. 5, 2022  (EP) .................................. 22020594

(51) Int. Cl.
*H04N 19/117*  (2014.01)
*H04N 19/147*  (2014.01)
(Continued)

(52) U.S. Cl.
CPC ......... *H04N 19/117* (2014.11); *H04N 19/147* (2014.11); *H04N 19/176* (2014.11);
(Continued)

(58) Field of Classification Search
CPC .. H04N 19/117; H04N 19/132; H04N 19/147; H04N 19/154; H04N 19/17;
(Continued)

(56) References Cited

U.S. PATENT DOCUMENTS

| 6,356,311 B1 * | 3/2002 | Matsumoto ........ H04N 21/6405 348/E7.054 |
| 12,262,020 B2 * | 3/2025 | Sjöberg ................ H04N 19/105 |

(Continued)

OTHER PUBLICATIONS

Canadian Office Action issued on Sep. 25, 2025 for corresponding Canadian Application No. 3221618.

*Primary Examiner* — Md N Haque
(74) *Attorney, Agent, or Firm* — POLSINELLI PC

(57) ABSTRACT

The present application relates to a method for verifying video data encoded in an encoder unit, wherein the encoder unit comprises a safe part and a non-safe part, wherein loop filtering in the encoder unit is disabled, and wherein the method (1) comprises the steps of:
  Acquiring video data in the safe part of the encoder unit (2,11,21);
  Encoding the acquired video data by a non-safe encoder in the non-safe part of the encoder unit (3,12,22);
  Decoding the encoded video data by a non-safe decoder in the non-safe part of the encoder unit (4,13,23); and
  Comparing the decoded video data with the acquired video data in the safe part of the encoder unit using at least one comparison algorithm (5,14,24), wherein if the decoded video data does not match the acquired video data exactly nor within an acceptable threshold for the comparison a safety focused reaction is initiated, and if the decoded video data matches the acquired video data exactly or within the acceptable threshold for the comparison a first safety sequence is generated based on the decoded video data in the safe part of the encoder unit and the encoded video data and the first safety sequence are transmitted to a decoder unit for decoding the encoded video data.

20 Claims, 4 Drawing Sheets

(51) Int. Cl.
*H04N 19/176* (2014.01)
*H04N 19/513* (2014.01)
*H04N 19/65* (2014.01)
*H04N 19/86* (2014.01)

(52) U.S. Cl.
CPC ........... *H04N 19/521* (2014.11); *H04N 19/65* (2014.11); *H04N 19/86* (2014.11)

(58) Field of Classification Search
CPC .... H04N 19/172; H04N 19/176; H04N 19/46; H04N 19/521; H04N 19/65; H04N 19/82; H04N 19/86
See application file for complete search history.

(56) References Cited

U.S. PATENT DOCUMENTS

2007/0157070 A1* 7/2007 Wenger ................. H04N 19/89
714/E11.04
2019/0007691 A1* 1/2019 Sjöberg ................. H04N 19/31

* cited by examiner

METHOD FOR VERIFYING VIDEO DATA ENCODED IN AN ENCODER UNIT

The present invention relates to a method for verifying video data encoded in an encoder unit, wherein the method can easily be implemented, and wherein the method can be configured in such a way, that video data encoded in the encoder unit can be verified in a relatively simple manner.

Common video surveillance or in-vehicle video applications do not rely on analog Closed-Circuit Television (CCTV) anymore, but use modern streaming video cameras, streaming video over networks like for example Ethernet.

When an optical sensor, such as a camera, is sampled, for example multiple video frames per second can be retrieved. Therein, in order to reduce the required network bandwidth, the data acquired from the optical sensor is usually compressed by a video codec, such as H.264/AVC or H.265/HEVC. The video data is then transmitted over a network, for example an Ethernet or a WLAN, to one or multiple receivers for example a computer, video recorder, some other displaying or processing unit or Human Machine Interface (HMI), for displaying the video data. Therein, the optical sensor usually uses an encoder to compress the video data, whilst the receiver uses a decoder to display, record or otherwise process the encoded video image frames.

Encoding is the process of translating information into a form that can be transmitted to another person or system. The sender must first encode their message in a way that can be understood by the recipient, and then the recipient must correspondingly decode the message in order to understand it. This process of encoding and decoding is essential for effective communication.

However, H.264/AVC and H.265/HEVC, like most modern video compression codecs, employ complicated techniques to reduce the bandwidth required to transmit a stream of video image frames. Further, many safety regulations have to be complied with in order to ensure the safety of products, activities or processes, such as IEC 61508, EN 50128 or EN 50657. IEC 61508 is intended to be a basic functional safety standard applicable to all kinds of industries, in particular to Electrical/Electronic/Programmable Electronic Safety-related Systems. EN 50128 and EN 50657 are European standards for safety relevant software in the railway domain which includes both the track and the train.

Therefore, both, an encoder and a decoder usually use complex algorithms, either implemented in software or offloaded to dedicated hardware to accelerate the video encoding/decoding process. Thus, it is usually a complicated task to verify that the used encoder and decoder fulfill the requirements of the safety regulations, such as IEC 61508, EN 50128 or EN 50657.

Further, streaming video systems, based on MJPEG, H.264/AVC or H.265/HEVC are used in various domains, for example the supervision of critical parts of manufacturing and power plants, or on vehicles like trains, trucks, agricultural vehicles, cars as a replacement for mirrors, camera assistance systems, or as part of driver assistance systems, or even as part of autonomous driving systems. In most applications, the systems are used without safety certification, which makes those systems vulnerable to potential safety hazards. Therefore, there is a need to enable such systems to operate safely, in particular safely according to corresponding safety standards.

US 2007/0157070 A1 discloses a method for verifying a match between states of a first video processor and a second video processor, wherein one of said first and second video processors is a video encoder utilizing predictive video encoding and the other one of said first and second video processors is a video decoder capable of reproducing a decoded bit stream from an encoded bit stream generated by said video encoder.

It is an object of the present invention to provide an improved method for verifying video data encoded in an encoder unit.

This object is solved by a method for verifying video data encoded in an encoder unit according to claim 1.

This object is further solved by an encoder unit according to claim 11.

According to one embodiment of the invention, this object is solved by a method for verifying video data encoded in an encoder unit, wherein the encoder unit comprises a safe part and a non-safe part, wherein loop filtering in the encoder unit is disabled, and wherein video data, in particular video data from a source of video data is acquired in the safe part of the encoder unit, the acquired video data is encoded by a non-safe encoder in the non-safe part of the encoder unit, wherein the encoded video data is decoded by a non-safe decoder in the non-safe part of the encoder unit and the decoded video data is compared with the acquired video data using at least one comparison algorithm in the safe part of the encoder unit, wherein if the decoded video data does not match the acquired video data exactly nor within an acceptable threshold for the comparison a safety focused reaction is initiated, and wherein if the decoded video data matches the acquired video data exactly or within the acceptable threshold a first safety sequence is generated based on the decoded video data in the safe part of the encoder unit and the encoded video data and the first safety sequence are transmitted to a decoder unit for decoding the encoded video data, wherein the step of comparing the decoded video data with the acquired video is based on whether Rate Distortion Optimization is performed. Therein, safe means that the corresponding part is safety-qualified and/or has a high integrity level and non-safe means that the corresponding part is not safety critical and does not have to be safety-qualified, wherein the safety focused reaction comprises flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit, or flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit and blanked in the decoder unit, or turning the corresponding source of video data off and/or deleting the video data acquired from the corresponding source of video data, and wherein the first safety sequence is one of a cryptographic hash, a checksum or a signature.

Here, video data is a representation of moving visual images respectively video frames.

Further, an encoding algorithm used in an encoder, for example a non-safe encoder for encoding video data usually comprises a motion estimation and prediction step, a transform and quantization step, a bitstream encoding step and decoder steps. During the motion estimation and prediction step, a block that needs to be encoded is predicted based on a similar block in the same video frame or a block from neighbouring frames. Motion that happened between the corresponding frames is estimated and communicated to a corresponding decoder with a motion vector. This step involves searching lots of regions of lots of frames and interpolating motion to sub-pixel precision. In the transformation and quantization step, residual data, respectively the difference between pixels in the block to be encoded and pixels in the corresponding block predicted by the motion estimation and prediction step, is transformed into the frequency domain, for example using a discrete cosine transform. The coefficients in the frequency domain are then quantized, respectively rounded to a quantization step size, where the quantization step size is usually determined by a lookup table depending on a so-called quantization parameter, to reduce respectively compress data. The resulting data is then encoded, for example with run length coding or arithmetic coding, in the bitstream encoding step, to efficiently eliminate redundancy in a corresponding bitstream and to compress it. Common encoders usually also include a decoder, wherein the decoder reverses the previously mentioned steps, in particular performs inverse quantization and inverse transform to calculate the decoded residual, wherein, after calculation of the decoded residual, the decoder, for each block of pixels, respectively adds the motion prediction to the decoded residual.

For some blocks the prediction step may produce a result that is so close to the original data that the transformation and quantization step may be skipped altogether if this would reduce the bandwidth so much that the loss in video quality is acceptable, wherein only a prediction may be transmitted, meaning that the transmission of the residual is skipped. This is part of a technique called Rate Distortion Optimization (RDO), wherein the acceptable quality loss during video encoding is determined not in absolute terms but relative to the bandwidth optimization that is achievable. The trade-off between loss in video quality and bandwidth gains is usually decided by using an equation that incorporates a metric of the video loss, usually the sum of squared errors or the sum of absolute errors, but sometimes also the sum of Hadamard transformed errors or other error metrics, and adding it to the achieved bitrate multiplied by a parameter called the Lagrange multiplier lambda, and trying to optimize this equation. In a Rate Distortion Optimization sense, a higher loss in video quality can be outweighed by a sufficiently lower bitrate, wherein the Lagrange multiplier lambda determines the bitrate's weight compared to the loss in video quality.

Some codecs like H.265 have extensions to Rate Distortion Optimization like Rate Distortion Optimized Quantization (RDOQ) or Sign Bit Hiding.

Rate Distortion Optimized Quantization (RDOQ) is a technique that selectively quantizes different parts of the video data more aggressively to optimize video compression by balancing the trade-off between bandwidth respectively bitrate and quality loss respectively distortion in an RDO sense. It employs techniques like optimizing the quantization of coefficients by using flexible rounding points, or setting low coefficients to zero, whenever this makes sense in an RDO sense. It can also decide to change the last significant coefficient that is coded in a block or eliminate a whole coefficient group. As for RDO, for low values of the Lagrange multiplier lambda, RDOQ is only employed in specific cases and only introduces small distortion.

Sign Bit Hiding is a technique to hide a sign bit for a group of non-zero coefficients. This is done by allowing to quantize a coefficient in a coefficient group differently so that the sign bit can be inferred by the parity, even or odd, of the sum of the absolute levels of the coefficients in the group.

Therein, loop-filters, respectively deblocking filters are usually used in both, an encoder and a decoder, to filter block edges, respectively block artefacts. Therein, a block artefact is a noticeable distortion of the pixel in the corresponding block caused by the application of lossy compression on a block level.

Further, a safe part is a part that is safety-qualified and/or has a comparable high Safety Integrity Level (SIL). Here, the encoder unit also includes at least one part that is not safety critical and does not have to be safety-qualified, in particular a non-safe encoder and a non-safe decoder.

Further, a safety focused reaction is an action that is initiated to avoid safety critical situations, wherein, according to the invention, the safety focused reaction comprises flagging decoded video data that does not correspond to the originally acquired video data, respectively regions in the decoded video data that do not correspond to the corresponding regions in the originally acquired video data, or turning the corresponding source of video data off and/or deleting the video data acquired from the corresponding source of video data. In particular, the first safety reaction can include flagging corresponding video frames or at least sub-regions of these video frames, wherein correspondingly flagged video frames or sub-regions of these video frames are transmitted to the decoder unit and blanked in the decoder unit.

That at least one comparison algorithm is used means that the comparison can be based on one or more comparison algorithm. For example, the step of comparing the decoded video data with the acquired video data can be based on two comparison algorithms, wherein, for each block in each video frame, the comparison can be based on one or both of these two algorithms, wherein only one of these two algorithms has to produce a match for the corresponding comparison to be deemed successful.

According to the invention, the first safety sequence is data added to ensure safety of end-to-end transmissions by combining some or all of the well-known techniques used for safety layers like for example using sequence counters and implicit data as well as the data itself, combined with checksums, cryptographic hashes and/or signatures.

Here, a checksum is a is a small-sized block of data derived from another block of digital data for the purpose of detecting errors that may for example have been introduced during its transmission or storage.

Further, a cryptographic hash is a security-based hash function which makes it almost impossible to reverse a code to the original data.

Further, a signature is a digital signature, respectively unique information that is added to encoded video data.

Such checksums, cryptographic hashes or signatures can usually be generated in a very simple way and enable checking data corruption in a very simple way.

Further, an acceptable threshold for the comparison is a threshold that is based on the fact that almost all video codecs are not lossless and change the pixel data in a video frame in order to strike the right balance between quality degradation and bandwidth improvement.

According to the method, the parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoding unit, can be kept very simple, especially when compared to the immensely complex non-safe encoder and non-safe decoder. Therefore, the method can easily be implemented, and the method can be configured in such a way, that video data encoded in the encoder unit can be verified in a relatively simple manner.

Further, that loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

Thus, an improved method for verifying video data encoded in an encoder unit might be provided.

In one embodiment, the step of comparing the decoded video data with the acquired video data can be based on two algorithms, in particular a first and a second algorithm, wherein, for each block in each video frame, the comparison can be based on one or both of these two algorithms, and wherein only one of these two algorithms has to produce a match for the comparison to be deemed successful.

The first algorithm comprises, for each video frame in the acquired video data, respectively receiving a corresponding motion-predicted video frame from the non-safe encoder, for each video frame in the acquired video data, respectively determining residual data for the corresponding video frame based on the acquired video frame and the corresponding motion-predicted video frame, for each video frame in the acquired video frame, respectively transforming the residual data for the corresponding video frame, wherein transforming the residual data respectively includes utilizing, for example block-wise utilizing the same transformation algorithms as used in the non-safe encoder to obtain transformed residual data, quantizing the transformed residual data using the same quantization step sizes as the non-safe encoder, inverse-quantizing the quantized residual data using the same quantization step sizes as the non-safe encoder, and inverse-transforming the inverse-quantized residual data by utilizing the same inverse transformation algorithms as used in the non-safe encoder, for each video frame in the acquired video data, respectively determining a comparison frame by adding the corresponding motion-predicted video frame to the transformed, quantized, inverse-quantized and inverse-transformed residual data for the corresponding video frame, for example the transformed, quantized, inverse-quantized and inverse-transformed residual data of all blocks, and, for each video frame in the acquired video data, respectively block-wise comparing the corresponding comparison frame with the corresponding decoded video frame from the non-safe decoder, respectively the corresponding video frame as decoded by the non-safe decoder.

Here, block-wise comparing the corresponding comparison frame with the corresponding decoded video frame from the non-safe decoder means that respectively blocks of data of the same, respectively a particular block size are compared.

Thus, the comparison is based on a common two-channel approach as widely used in safety critical systems, wherein two independent and ideally diverse channels perform the same computations, and wherein afterwards the results are compared.

This has the advantage that the comparison is deterministic and pre-determined and does not depend on a probabilistic threshold. Such a probabilistic threshold is usually used when comparing two images respectively video frames, wherein such a probabilistic threshold is, however, problematic when used in vital, mission critical and safety critical systems, as in such systems availability, respectively that the system should always work, and safety, respectively that the system must ensure a high level of safety integrity, should be considered at the same time. Further, the very computationally intense respectively expensive loop-filters can be completely omitted, wherein on the other hand the motion prediction, respectively the most computationally intense respectively expensive step of the steps performed in the non-safe encoder does not have to repeated.

The second algorithm comprises, for each video frame in the acquired video data, respectively receiving a corresponding motion-predicted video frame including motion-predicted data from the non-safe encoder, wherein, for each block of a plurality of blocks of the motion-predicted video frame, residual data for the corresponding block is respectively determined by subtracting the motion-predicted data for the corresponding block from the corresponding data in the corresponding block of the acquired video frame, an error metric, usually the sum of squared errors or the sum of absolute errors, is computed for the determined residual data of the corresponding block and the error metric is compared to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

Here, a quantization parameter is a parameter that defines how much spatial detail is retained. In particular, when the quantization parameter is very small, almost all the detail is retained. On the other hand, as the quantization parameter is increased, some of the detail is lost so that the bit rate drops at the price of some increase in distortion and some loss of quality.

The second algorithm covers the case where the non-safe encoder skips the transmission of the residual data for a block in the RDO sense, which is the case when the decoded data of a block, as retrieved from the non-safe decoder, is the same as the motion-predicted data of a block, as retrieved from the non-safe encoder. In this case, the residual data of a block, which is determined by subtracting the motion-predicted data of the block from the corresponding block of the acquired video frame, is checked by the second algorithm to determine if the corresponding residual data is indeed small enough, as determined by the error metric for the non-safe encoder, to be allowed to skip the transmission of the residual data for the block in an RDO sense. Therein, the predetermined threshold depends on the block size of the corresponding block.

In another embodiment, the step of comparing the decoded video data with the acquired video data is completely based on a quantization parameter and an RDO parameter lambda used in the non-safe encoder, wherein the step of comparing the decoded video data with the acquired video data can be based on two algorithms, in particular a third and a fourth algorithm, wherein, for each block in each video frame, the comparison can be based on one or both of these two algorithms, and wherein only one of these two algorithms has to produce a match for the comparison to be deemed successful.

The third algorithm comprises a step of, for each transformed coefficient of each transformation carried out in the non-safe encoder, computing a transformed coefficient threshold based on the quantization parameter, wherein the step of comparing the decoded video data with the acquired video data in the safe part of the encoder unit comprises, for each video frame in the acquired video data, using the corresponding acquired video frame as a comparison frame and respectively block-wise comparing the corresponding comparison frame with the corresponding decoded video frame by dividing the corresponding decoded video frame into a plurality of blocks of pixels, for each of the plurality of blocks of pixels respectively transforming the corresponding block of pixels of the decoded video frame and a corresponding block of pixels of the corresponding comparison frame respectively using the same transformation algorithms as used in the non-safe encoder, and for each of the plurality of blocks of pixels respectively comparing the corresponding transformed block of pixels of the decoded video frame with the corresponding transformed block of pixels of the corresponding comparison frame using the quantization parameter by comparing the transformed coefficients of the transformation of the corresponding block of pixels of the decoded video frame with the transformed coefficients of the transformation of the corresponding block of pixels of the corresponding comparison frame using the transformed coefficient thresholds and additionally accounting for numerical errors due to fixed point arithmetic in coefficients and rounding on all transformed coefficients.

Here, the transformed coefficients are the coefficients that are transformed during the transformation and quantization steps carried out in the non-safe encoder, wherein a transformed coefficient threshold is a threshold for the corresponding transformed coefficient, respectively a threshold for the deviation between a corresponding transformed coefficient of the transformation of the corresponding block of pixels of the decoded video frame and the corresponding transformed coefficient of the transformation of the corresponding block of pixels of the corresponding acquired video frame.

Further, the numerical error depends on the used block size.

Further, an additional error resulting from extensions to Rate Distortion Optimization like Rate Distortion Optimized Quantization or Sign Bit Hiding or both can be accounted for if such techniques are being used.

Furthermore, that a transformed block of pixels of the decoded video frame is compared with the corresponding transformed block of pixels of the corresponding acquired video frame using the quantization parameter based transformed coefficient thresholds on all transformed coefficients means that the resulting transformation coefficients are respectively compared to match within a corresponding quantization parameter based transformed coefficient threshold, respectively that it is determined whether the resulting transformation coefficients respectively do not deviate from each other by more than the corresponding quantization parameter based threshold.

This has the advantage that a deterministic threshold that is based on the quality of the video stream as it was originally encoded can be used for comparing the decoded video data with the acquired video data instead of a probabilistic threshold, wherein the corresponding video frame does not have to be separated into a motion predicted part and a residual.

The fourth algorithm comprises, for each video frame in the acquired video data, using the corresponding decoded video frame and subtracting it from the corresponding acquired video frame to determine an error frame including error data, and respectively block-wise calculating an error metric, usually the sum of squared errors or the sum of absolute errors, for the determined error data of the corresponding block in the error frame and comparing the corresponding error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

The fourth algorithm covers the case where the non-safe encoder skips the transmission of the residual data for a block in the RDO sense, which is allowed when the decoded data of a block, as retrieved from the non-safe decoder, is close enough to the original data of a block, as retrieved from the acquired video data. In this case, the difference between the decoded data and the original data of a block is checked by the fourth algorithm to determine if this residual data for the corresponding block is indeed small enough, as determined by the error metric, for the non-safe encoder to be allowed to skip for the transmission of the residual data for the block in an RDO sense. Therein, the predetermined threshold depends on the block size of the corresponding block.

Using a deterministic threshold based on the quantization parameter and the Lagrange multiplier lambda also means that the quantization parameter of the video stream as well as the Lagrange multiplier lambda, or at least their respective maximum, respectively worst-case values, need to be known. Using a constant quantization parameter or restricting the quantization parameter to not exceed a pre-specified maximum as well as setting the Lagrange multiplier lambda is, however, an available standard option on modern codecs like for example H.264/AVC or H.265/HEVC.

Further, block-wise comparing the corresponding comparison frame with the corresponding decoded video frame from the non-safe decoder again means that respectively blocks of data of the same, respectively a particular block size are compared.

Therein, regarding the first and the third algorithm, the step of block-wise comparing the corresponding comparison frame with the corresponding decoded video frame can respectively comprise block-wise comparing the corresponding comparison frame with the decoded video frame based on a first block size and block-wise comparing the corresponding comparison frame with the decoded video frame based on at least one second block size, wherein each of the first block size and the at least one second block size is a different block size, and wherein the decoded video data matches the acquired video data exactly or within an acceptable threshold for the comparison if for each pixel in the acquired video frame respectively a block in the corresponding comparison frame containing the corresponding pixel corresponds to a block in the corresponding decoded video frame containing the corresponding pixel based on at least one of the different block sizes, respectively at least one of the first and the at least one second block size.

Regarding the second and the fourth algorithm, the step of block-wise calculating an error metric for the determined error data of the corresponding block in the error frame and comparing the corresponding error metric to the predetermined threshold comprises block-wise calculating an error metric for the determined error data of the corresponding block in the error frame and comparing the corresponding error metric to the predetermined threshold based on a first block size and block-wise calculating an error metric for the determined error data of the corresponding block in the error frame and comparing the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes, respectively at least one of the first and the at least one second block size.

Here, block-size means the size of blocks used during the comparison. That the corresponding comparison frame is block-wise compared with the decoded video frame based on a first block size means that blocks of a first size are used when comparing the corresponding comparison frame with the decoded video frame. Similarly, that the corresponding comparison frame is block-wise compared with the decoded video frame based on the at least one second block size means that the comparison is at least also carried out based on blocks of one size different than the first size.

Further, that a block in the corresponding comparison frame containing the corresponding pixel matches, respectively corresponds to a block in the corresponding decoded video frame containing the corresponding pixel based on at least one of the block sizes means that corresponding blocks of the first block size and/or corresponding blocks of one or more of the at least one second block size correspond to each other.

Therein, the comparison can for example be carried out based on blocks of a first block size of 4×4 blocks, based on blocks of a second block size of 8×8 blocks, based on blocks of a third block size of 16×16 blocks, and based on blocks of a fourth block size of 32×32 blocks, wherein, if it is assumed that a block of the decoded video data corresponds to the respective block of the acquired video data based on one of these different block sizes, it is also assumed that the decoded video data corresponds to the acquired video data for all pixels in that block, and no further computations need to be performed for any other block sizes as soon as one block size yields a successful comparison for each pixel. This is especially useful when the safe part of the encoder is realized based on Field Programmable Gate Arrays (FPGAs) and/or Application-specific integrated circuits (ASICs), where comparisons in different block sizes can be performed in parallel. Using different block sizes is further necessary because codecs like for example H.265/HEVC can partition a video frame into various transformation block sizes by means of so-called quad-trees, so that each pixel in a video frame could be transformed as part of a 4×4, 8×8, 16×16 or 32×32 block.

According to a further embodiment of the invention, a method for verifying video data transmitted from a source of video data to a processing unit for processing the video data by means of an encoder unit, wherein the encoder unit comprises a safe part and a non-safe part, and a decoder unit, wherein the decoder unit comprises a safe part and a non-safe part, is provided, wherein loop filtering in the encoder unit is disabled, wherein loop filtering in the decoder unit is disabled, wherein video data from the source of video data is acquired in the safe part of the encoder unit, the video data is encoded in the non-safe part of the encoder unit, and wherein the video data encoded in the non-safe part of the encoder unit is verified by a method for verifying video data encoded in an encoder unit as described above, the encoded video data and, in case of successful verification in the encoder unit, a corresponding first safety sequence are transmitted to the decoder unit, wherein the encoded video data is decoded by a non-safe decoder in the non-safe part of the decoder unit, a second safety sequence data is generated in the safe part of the decoder unit based on the decoded video data, and the first safety sequence is compared with the second safety sequence in the safe part of the decoder unit, wherein the decoded video data is transmitted to the processing unit for further processing the video data if the first safety sequence corresponds to the second safety sequence, and wherein a safety focused reaction is initiated if the first safety sequence does not correspond to the second safety sequence, wherein the second safety sequence is one of a cryptographic hash, a checksum or a signature.

Therein, a source of video data is a device that can acquire video data, for example an optical sensor. In particular, the source of video data can be a CMOS (complementary metal-oxide-semiconductor) camera sensor, or another system that can provide video frames to the encoder unit.

Further, a processing unit is a unit that is configured to process data transmitted to the processing unit, for example a display for displaying the transmitted data or a driver assistance system of a vehicle, respectively a function of an autonomous driving vehicle.

Thus, an improved method for verifying video data transmitted from a source of video data to a processing unit for processing the video data might be provided. According to the method, the parts of the encoder unit and the parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoder unit or a safe safety sequence generating unit for generating the second safety sequence in the decoder unit can be kept very simple, especially when compared to the immensely complex non-safe decoder. Therefore, the method can easily be implemented, and the method can be configured in such a way, that video data encoded in the encoder unit can be verified in a relatively simple manner. Further, a two-step safety mechanism, in particular comparing the decoded video data with the acquired video data on the one hand and comparing a first and second safety sequence on the other hand, is provided that provides end-to-end protection for video data, for example video frames. That loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

Therein, the method can further comprise a step of filtering block artifacts in the decoded video data in the safe part of the decoder unit if the first safety sequence corresponds to the second safety sequence, wherein the filtered decoded video data is then transmitted to the processing unit for further processing. In particular, the edges of the corresponding blocks can at least be smoothed to some extent without having to reproduce the original deblocking filter. To the contrary, a simplified filter can be utilized to only perform the edge offset filter operations, or a simplified version thereof, for example a simplified version of the H.265/HEVC deblocking filter, wherein for example the offset filter operations, for example H.265/HEVC's sample adaptive offset filter, can be omitted or modified to be simpler. In either case, the filters, for example edge filters or offset filters, need to be modified to work as a pure post processing step since they are now not in-loop within the encoder anymore, but used after decoding in the decoder only.

Further, the step of transmitting the first safety sequence to the decoder unit can comprise transmitting the first safety sequence to the decoder unit over a safety layer.

Here, safety layer is a technique respectively communication layer that ensures that the transmitted data can be checked by the receiver to verify that the data is not outdated respectively stale, or that the data is not transmitted out of sequence, and that the data has the integrity for the required safety level.

Thereby, it can be verified that the first safety sequence is safely transmitted to the decoder unit.

Further, the method can further comprise respectively encrypting the encoded video data and the corresponding first safety sequence, wherein the step of transmitting the encoded video data and the first safety sequence to the decoder unit comprises transmitting the encrypted encoded video data and the encrypted first safety sequence to the decoder unit. Thereby, confidentiality can be ensured.

Further, the method can further comprise the step of adding a message authentication code to the communication between the encoder unit and the decoder unit, respectively to the encoded video data and the corresponding first safety sequence, wherein the step of transmitting the encoded video data and the first safety sequence to the decoder unit comprises transmitting the encoded video data and the first safety sequence together with the message authentication code to the decoder unit.

Here, a message authentication code is a cryptographic checksum on data that uses a key to detect both accidental and intentional modifications of the data. The message authentication code can also be signed with an asymmetric key algorithm, and the signature can be transmitted alongside with the message authentication code.

Thereby, integrity and authenticity can be provided.

According to still another embodiment of the invention, an encoder unit is provided, wherein loop filtering in the encoder unit is disabled, and wherein the encoder unit comprises a safe acquiring unit, wherein the safe acquiring unit is configured to acquire video data, in particular video data from a source of video data, a non-safe encoder, wherein the non-safe encoder is configured to encode the acquired video data, a non-safe decoder, wherein the non-safe decoder is configured to decode the encoded video data, and a safe comparing unit, wherein the safe comparing unit is configured to compare the decoded video data with the acquired video data using at least one comparison algorithm, wherein the safe comparing unit is configured to initiate a safety focused reaction if the decoded video data does not match the acquired video data exactly nor within an acceptable threshold for the comparison, and to generate a first safety sequence based on the decoded video data, wherein the encoded video and the first safety sequence are transmitted to a decoder unit for decoding the encoded video data, if the decoded video data matches the acquired video data exactly or within the acceptable threshold for the comparison, wherein the safe comparing unit is configured to compare the decoded video data with the acquired video data based on whether Rate Distortion Optimization is performed. Therein, safe means that the corresponding part is safety-qualified and/or has a high integrity level and non-safe means that the corresponding part is not safety critical and does not have to be safety-qualified, wherein the safety focused reaction comprises flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit, or flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit and blanked in the decoder unit, or turning the corresponding source of video data off and/or deleting the video data acquired from the corresponding source of video data, and wherein the first safety sequence is one of a cryptographic hash, a checksum or a signature.

Thus, an improved encoder unit might be provided. According to the encoder unit, parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoding unit, can be kept very simple. Therefore, the verification of the encoded video data can easily be implemented and be configured in such a way, that video data encoded in the encoder unit can be verified in a relatively simple manner. That loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

In one embodiment, the safe comparing unit is configured to base the comparison between the decoded video data with the acquired video data on two algorithms, in particular a first and a second algorithm, wherein, for each block in each video frame, the comparison can be based on one or both of these two algorithms, wherein only one of these two algorithms has to produce a match for the comparison to be deemed successful.

Regarding the first algorithm, the safe comparing unit is configured to, for each video frame in the acquired video data, respectively receive a corresponding motion-predicted video frame from the non-safe encoder, respectively determine residual data for the corresponding video frame based on the acquired video frame and the corresponding motion-predicted video frame, and respectively block-wise transform the residual data for the corresponding video frame by utilizing the same transformation algorithms as used in the non-safe encoder to obtain transformed residual data, quantizing the transformed residual data using the same quantization step sizes as the non-safe encoder, inverse-quantizing the quantized residual data using the same quantization step sizes as the non-safe encoder, and inverse-transforming the inverse-quantized residual data by utilizing the same inverse transformation algorithms as used in the non-safe encoder, wherein the safe comparing unit is further configured to, for each video frame in the acquired video data, respectively determine a comparison frame by adding the corresponding motion-predicted video frame to the block-wise inverse-transformed residual data for the corresponding video frame, and to, for each video frame in the acquired video data, respectively block-wise compare the corresponding comparison frame with the corresponding decoded video frame. This has the advantage that the comparison is deterministic and does not depend on a probabilistic threshold. Such a probabilistic threshold is usually used when comparing two images respectively video frames, wherein such a probabilistic threshold is, however, problematic when used in vital, mission critical and safety critical systems, as in such systems availability, respectively that the system should always work, and safety, respectively that the system must ensure a high level of safety integrity, should be considered at the same time. Further, the very computationally intense respectively expensive loop-filters can be completely omitted, wherein on the other hand the motion prediction, respectively the most computationally intense respectively expensive step of the steps performed in the non-safe decoder does not have to repeated.

Regarding the second algorithm, the safe comparing unit is configured to, for each video frame in the acquired video data, respectively receive a corresponding motion-predicted video frame including motion-predicted data from the non-safe encoder, for each block of a plurality of blocks of the motion-predicted video frame respectively determine residual data for the corresponding block by subtracting the motion-predicted data for the corresponding block from the corresponding data in the corresponding block of the acquired video frame, calculate an error metric for the determined residual data of the corresponding block and respectively compare the corresponding error metric, usually the sum of squared errors or the sum of absolute errors, to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold. The second algorithm covers the case where the non-safe encoder skips the transmission of the residual data for a block in the RDO sense, which is the case when the decoded data of a block, as retrieved from the non-safe decoder, is the same as the motion-predicted data of a corresponding block, as retrieved from the non-safe encoder. In this case, the residual data of a block, which is determined by subtracting the motion-predicted data of the block from the corresponding block of the acquired video frame is checked by the second algorithm to determine if this residual data for the block is indeed small enough, as determined by the error metric for the non-safe encoder to be allowed to skip the transmission of the residual data for the block in an RDO sense. Therein, the predetermined threshold depends on the block size of the corresponding block.

In another embodiment, the safe comparing unit is configured to completely compare the decoded video data with the acquired video based on a quantization parameter and an RDO parameter lambda used in the non-safe encoder, wherein the safe comparing unit is again configured to base the comparison between the decoded video data with the acquired video data on two algorithms, in particular a third and a fourth algorithm, wherein, for each block in each video frame, the comparison can be based on one or both of these two algorithms, and wherein only one of these two algorithms has to produce a match for the comparison to be deemed successful.

Regarding the third algorithm, the safe comparing unit is configured to, for each transformed coefficient of each transformation carried out in the non-safe encoder, compute a transformed coefficient threshold based on the quantization parameter, and to for each video frame in the acquired video data, use the corresponding acquired video frame as a comparison frame and respectively block-wise compare the corresponding comparison frame with the corresponding decoded video frame by dividing the corresponding decoded video frame into a plurality of blocks of pixels, for each of the plurality of blocks of pixels respectively transform the corresponding block of pixels of the decoded video frame and a corresponding block of pixels of the corresponding comparison frame respectively using the same transformations as used in the non-safe encoder, and for each of the plurality of blocks of pixels respectively compare the corresponding transformed block of pixels of the decoded video frame with the corresponding transformed block of pixels of the corresponding comparison frame by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients. This has the advantage that a deterministic threshold that is based on the quality of the video stream as it was originally encoded can be used for comparing the decoded video data with the acquired video data instead of a probabilistic threshold, wherein the same video frame does not have to be separated into a motion predicted part and a residual. Therein, the numerical error depends on the used block size.

Therein, an additional error resulting from extensions to Rate Distortion Optimization like Rate Distortion Optimized Quantization or Sign Bit Hiding or both can be accounted for if such techniques are being used.

Regarding the fourth algorithm, the safe comparing unit is configured to, for each video frame in the acquired video data, use the corresponding decoded video frame and subtracting the corresponding decoded video frame from the corresponding acquired video frame to determine an error frame including error data, block-wise calculate an error metric for the determined error data of the corresponding block in the error frame and compare the corresponding error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold. The fourth algorithm covers the case where the non-safe encoder skips the transmission of the residual data for a block in the RDO sense, which is allowed when the decoded data of a block, as retrieved from the non-safe decoder, is close enough to the original data of a corresponding block, as retrieved from the acquired video data. In this case, the difference between the decoded data and the original data of a block is checked by the fourth algorithm to determine if this residual data for the block is indeed small enough, as determined by the error metric, for the non-safe encoder to be allowed to skip for the transmission of the residual data for the block in an RDO sense. Therein, the predetermined threshold depends on the block size of the corresponding block.

Therein, regarding the first and the third algorithm, the safe comparing unit can respectively be further configured to block-wise compare the corresponding comparison frame with the corresponding acquired video frame based on a first block size and to block-wise compare the corresponding comparison frame with the corresponding acquired video frame based on at least one second block size, wherein each of the first block size and the at least one second block size is a different block size, and wherein the decoded video data matches the acquired video data exactly or within an acceptable threshold for the comparison if for each pixel in the acquired video frame respectively a block in the corresponding comparison frame containing the corresponding pixel corresponds to a block in the corresponding decoded video frame containing the corresponding pixel based on at least one of the different block sizes.

Regarding the second and the fourth algorithm, the safe comparing unit is configured to block-wise calculate an error metric for the determined error data of the corresponding block in the error frame and compare the corresponding error metric to the predetermined threshold based on a first block size and to block-wise calculate an error metric for the determined error data of the corresponding block in the error frame and compare the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

Therein, the comparison can for example be carried out based on blocks of a first block size of 4×4 blocks, based on blocks of a second block size of 8×8 blocks, based on blocks of a third block size of 16×16 blocks, and based on blocks of a fourth block size of 32×32 blocks, wherein, if it is assumed that a block of the decoded video data corresponds to the respective block of the acquired video data based on one of these different block sizes, it is also assumed that that the decoded video data corresponds to the acquired video data for all pixels in that block, and no further computations need to be performed for any other block sizes as soon as one block size yields a successful comparison. This is especially useful when the safe part of the encoder is realized based on Field Programmable Gate Arrays (FPGAs) and/or Application-specific integrated circuits, where comparisons in different block sizes can be performed in parallel. Using different block sizes is further necessary because codecs like for example H.265/HEVC can partition a video frame into various transformation block sizes by means of so-called quad-trees, so that each pixel in a video frame could be transformed as part of a 4×4, 8×8, 16×16 or 32×32 block.

According to still a further embodiment of the invention, a decoder unit is provided, wherein loop filtering in the decoder unit is disabled, and wherein the decoder unit comprises a receiver to receive encoded video data, wherein the encoded video data has been verified by an encoder unit as described above, and wherein a corresponding first safety sequence in case of successful verification in the encoder unit has been created and has been sent to the decoder unit, wherein the decoder unit further comprises a non-safe decoder, wherein the non-safe decoder is configured to decode the encoded video data, a safe safety sequence generating unit, wherein the safe safety sequence generating unit is configured to generate a second safety sequence based on the decoded video data in the decoder unit, and a safe safety sequence matching unit, wherein the safe safety sequence matching unit is configured to compare the first safety sequence with the second safety sequence, wherein the safe safety sequence matching unit is configured to allow transmission of the decoded video data to a processing unit for further processing the video data if the first safety sequence corresponds to the second safety sequence, and to initiate a safety focused reaction if the first safety sequence does not correspond to the second safety sequence, wherein the second safety sequence is one of a cryptographic hash, a checksum or a signature.

Thus, an improved decoder unit might be provided. According to the decoder unit, parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example the safe safety sequence matching unit to compare the first safety sequence with the second safety sequence, can be kept very simple. Therefore, the verification of the encoded video data can easily be implemented and be configured in such a way, that video data encoded in the encoder unit can be verified in a relatively simple manner. Further, a two-step safety mechanism, in particular comparing the decoded video data with the acquired video data on the one hand and comparing a first and second safety sequence on the other hand, is provided that provides end-to-end protection for video data, for example video frames. That loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

Therein, the decoder unit further can comprise a safe filter unit in the safe part of the decoder unit, wherein the safe filter unit is configured to filter block artifacts in the decoded video data if the first safety sequence corresponds to the second safety sequence. In particular, the edges of the corresponding blocks can at least be smoothed to some extent without having to reproduce the original deblocking filter. To the contrary, a simplified filter can be utilized to only perform the edge offset filter operations, or a simplified version thereof, for example a simplified version of the H.265/HEVC deblocking filter, wherein for example the offset filter operations, for example H.265/HEVC's sample adaptive offset filter, can be omitted or modified to be simpler. In either case, the filters, for example edge filters or offset filters, need to be modified to work as a pure post processing step since they are now not in-loop within the encoder anymore, but used after decoding in the decoder only.

According to still a further embodiment of the invention, a system for verifying video data transmitted from a source of video data to a processing unit for processing the video data is provided, wherein the system comprises a source of video data for acquiring video data, an encoder unit as described above, a transmitting unit, a decoder unit as described above, and a processing unit for processing the acquired video data, wherein the encoder unit is configured to generate encoded video data based on the video data acquired by the source of video data, wherein the transmitting unit is configured to transmit the encoded video data from the encoder unit to the decoder unit, wherein the decoder unit is configured to decode the encoded video data and to transmit the decoded video data to the processing unit.

Thus, an improved system for verifying video data transmitted from a source of video data to a processing unit for processing the video data might be provided. According to the system, parts of the encoder unit and parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoding unit or a safe safety sequence generating unit for generating the second safety sequence in the decoder unit, can be kept very simple. Therefore, the system can easily be implemented, and the system can be configured in such a way, that video data encoded in the encoder unit can be verified in a relatively simple manner. Further, a two-step safety mechanism, in particular comparing the decoded video data with the acquired video data on the one hand and comparing a first and second safety sequence on the other hand, is provided that provides end-to-end protection for video data, for example video frames. That loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams. Therein, the decoder unit can comprise a safe filter unit described above to perform block artefact filtering as a pure post-processing step in the safe part of the decoder unit.

Therein, the transmitting unit can be configured to transmit the first safety sequence to the decoder unit over a safety layer. Thereby, it can verified that the first safety sequence is safely transmitted to the decoder unit.

Further, the system can further comprise an encrypting unit, wherein the encrypting unit is configured to respectively encrypt the encoded video data and the corresponding first safety sequence, and wherein the transmitting unit is configured to transmit the encrypted encoded video data and the encrypted corresponding first safety sequence to the decoder unit. Thereby, confidentiality can be ensured.

Further, the system can further comprise an adding unit, wherein the adding unit is configured to add a message authentication code to the encoded video data and the corresponding first safety sequence, and wherein the transmitting unit is configured to transmit the encoded video data and the corresponding first safety sequence together with the message authentication code to the decoder unit.

Here, a message authentication code is a cryptographic checksum on data that uses a key to detect both accidental and intentional modifications of the data. The message authentication code can also be signed with an asymmetric key algorithm, and the signature can be transmitted alongside with the message authentication code.

Thereby, integrity and authenticity can be provided.

The invention will now be described in further detail with reference to the attached drawings.

FIG. 1 illustrates a flowchart of a method for verifying video data encoded in an encoder unit 1 according to embodiments of the invention.

Almost all video codecs are not lossless and change the pixel data in a video frame in order to strike the right balance between quality degradation and bandwidth improvement. Therefore, the original acquired video frame usually does not exactly correspond to the encoded and then decoded video frame. Further, the comparison between the original acquired video frame and the encoded and then decoded video frame would be based on a probabilistic threshold when using standard image comparison algorithms, which is, however problematic when used in vital, mission critical and safety critical systems, as in such systems availability, respectively that the system should always work, and safety, respectively that the system must ensure a high level of safety integrity, should be considered at the same time. For example, in H.264/AVC and H.265/HEVC, there are two sources where data is actually lost during the compression, in particular the loop filters and the quantization step.

Therefore, it is preferred to have a deterministic threshold that does not rely on a probabilistic threshold.

Figure 1:
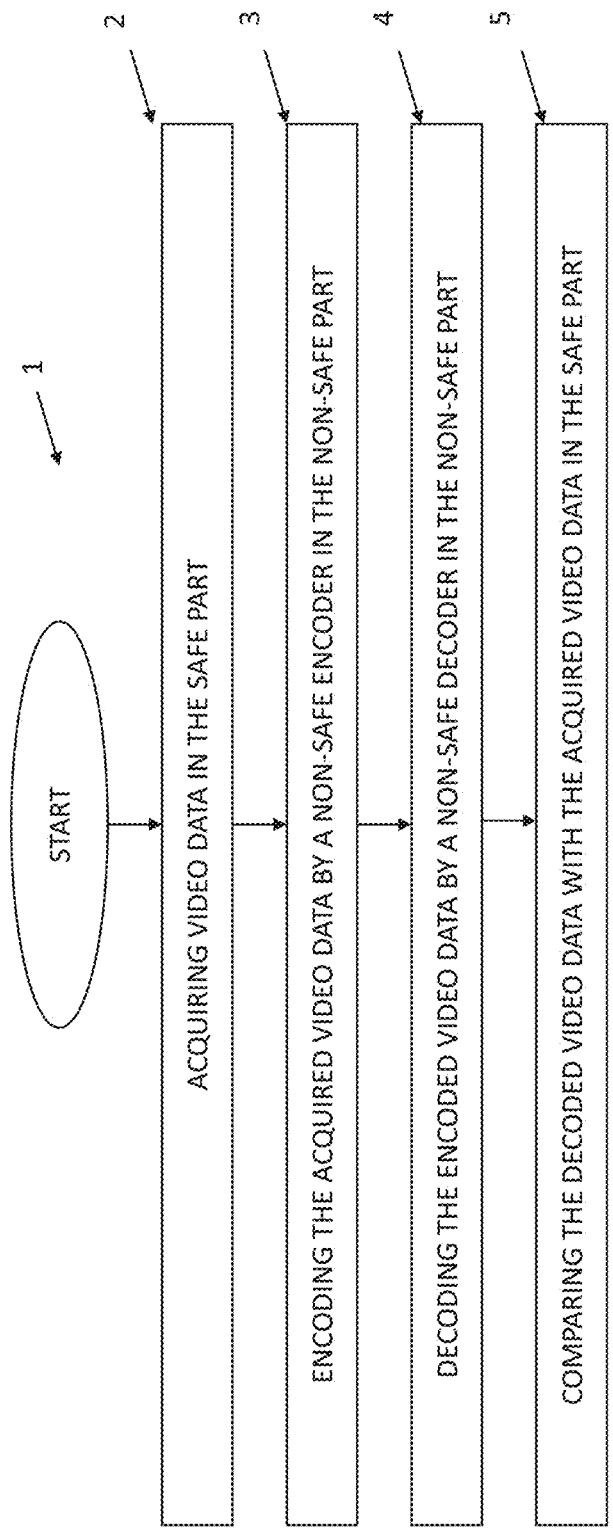
FIG. 1 illustrates a flowchart of a method for verifying video data encoded in an encoder unit according to embodiments of the invention.

FIG. 1 shows a method for verifying video data encoded in a encoder unit 1, wherein the encoder unit comprises a safe part and a non-safe part, wherein loop filtering in the encoder unit is disabled, and wherein the method 1 comprises a step 2 of acquiring video data from a source of video data in the safe part of the encoder unit, a step 3 of encoding the acquired video data by a non-safe encoder in the non-safe part of the encoder unit, wherein the encoded video data is decoded by a non-safe decoder in the non-safe part of the encoder unit in a step 4 and the decoded video data is compared with the acquired video data using at least one comparison algorithm in the safe part of the encoder unit in a step 5, wherein if the decoded video data does not match the acquired video data exactly nor within an acceptable threshold for the comparison a safety focused reaction is initiated, and wherein if the decoded video data matches the acquired video data exactly or within the acceptable threshold for the comparison a first safety sequence is generated based on the decoded video data and the encoded video data and the first safety sequence are transmitted to a decoder unit for decoding the encoded video data, wherein the step of comparing the decoded video data with the acquired video is based on whether Rate Distortion Optimization is performed. Therein, safe means that the corresponding part is safety-qualified and/or has a high integrity level and non-safe means that the corresponding part is not safety critical and does not have to be safety-qualified, wherein the safety focused reaction comprises flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit, or flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit and blanked in the decoder unit, or turning the corresponding source of video data off and/or deleting the video data acquired from the corresponding source of video data, and wherein the first safety sequence is one of a cryptographic hash, a checksum or a signature.

According to the shown method 1, parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoder unit, can be kept very simple, especially when compared to the immensely complex non-safe encoder and non-safe decoder. Therefore, the method 1 can easily be implemented, and the method 1 can be configured in such a way, that video data encoded in the encoder unit can be verified in a relatively simple manner.

Further, that loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

Thus, an improved method for verifying video data encoded in an encoder unit 1 might be provided.

Therein, all safe processing modules of the encoder unit can for example easily be implemented in Field Programmable Gate Arrays (FPGAs) or on modern and powerful processors. Further, the modules that need to be safety-qualified and thus are time consuming to develop can be kept relatively simple, whereas the complicated modules do not need to be safety qualified and can rather be made safe by the method 1 itself.

Therein, the step 5 of comparing the decoded video data to the acquired video data can be based on two algorithms, in particular a first and a second algorithm, wherein, for each block in each video frame, only one of these two algorithms, in particular a first and a second algorithm, has to produce a match for the comparison to be deemed successful. In particular, each block in the decoded video data can be compared to a corresponding block in the acquired video data based on at least one of these two algorithms, wherein only one of these two algorithms has to be successful to determine that the corresponding blocks match each other.

The first algorithm comprises the steps of, for each video frame in the acquired video data, respectively receiving a corresponding motion-predicted video frame from the non-safe encoder, for each video frame in the acquired video data respectively determining residual data for the corresponding video frame based on the acquired video frame and the corresponding motion-predicted video frame, for each video frame in the acquired video frame respectively block-wise transforming the residual data for the corresponding video frame, wherein transforming the residual data respectively includes utilizing the same transformation algorithms as used in the non-safe encoder to obtain transformed residual data, quantizing the transformed residual data using the same quantization step sizes as the non-safe encoder, inverse-quantizing the quantized residual data using the same quantization step sizes as the non-safe encoder, and inverse-transforming the inverse-quantized residual data by utilizing the same inverse transformation algorithms as used in the non-safe encoder, for each video frame in the acquired video data respectively determining a comparison frame by adding the corresponding motion-predicted video frame to the block-wise inverse-transformed residual data for the corresponding video frame, and for each video frame in the acquired video data respectively block-wise comparing the corresponding comparison frame with the corresponding decoded video frame.

The second algorithm comprises, for each video frame in the acquired video data, respectively receiving a corresponding motion-predicted video frame including motion-predicted data from the non-safe encoder, wherein for each block of a plurality of blocks of the motion-predicted video frame, residual data for the corresponding block is respectively determined by subtracting the motion-predicted data for the corresponding block from the corresponding data in the corresponding block of the acquired video frame, an error metric, usually the sum of squared errors or the sum of absolute errors, is computed for the determined residual data of the corresponding block and the corresponding error metric is compared to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

In another embodiment, the step 5 of comparing the decoded video data with the acquired video data is completely based on a quantization parameter and an RDO parameter lambda used in the non-safe encoder, wherein the step of comparing the decoded video data with the acquired video data can be based on two algorithms, in particular a third and a fourth algorithm, wherein, for each block in each video frame, only one of these two algorithms has to produce a match for the comparison to be deemed successful. In particular, each block in the decoded video data can be compared to a corresponding block in the acquired video data based on at least one of these two algorithms, wherein only one of these two algorithms has to be successful to determine that the corresponding blocks match each other.

Regarding the third algorithm, the method further comprises a step of, for each transformed coefficient of each transformation carried out in the non-safe encoder, computing a transformed coefficient threshold based on the quantization parameter, wherein the step of comparing the decoded video data with the acquired video data in the safe part of the encoder unit comprises, for each video frame in the acquired video data, using the corresponding acquired video frame as a comparison frame and respectively block-wise comparing the corresponding comparison frame with the corresponding decoded video frame by dividing the corresponding decoded video frame into a plurality of blocks of pixels, for each of the plurality of blocks of pixels respectively transforming the corresponding block of pixels of the decoded video frame and a corresponding block of pixels of the corresponding comparison frame respectively using the same transformation algorithms as used in the non-safe encoder, and for each of the plurality of blocks of pixels respectively comparing the corresponding transformed block of pixels of the decoded video frame with the corresponding transformed block of pixels of the corresponding comparison frame using the quantization parameter by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients.

The fourth algorithm comprises, for each video frame in the acquired video data, using the corresponding decoded video frame and subtracting it from the corresponding acquired video frame to determine an error frame including error data, and respectively block-wise calculating an error metric, usually the sum of squared errors or the sum of absolute errors, for the determined error data of that block in the error frame and comparing the corresponding error metric to a predetermined threshold that is derived from the quantization parameter and the Lagrange multiplier lambda parameter in the Rate Distortion Optimization (RDO) equation as used in the non-safe encoder, wherein the comparison is deemed successful for the corresponding block if the corresponding error metric does not exceed the predetermined threshold.

Therein, regarding the first and the third algorithm, the step of block-wise comparing the corresponding comparison frame with the corresponding decoded video frame can respectively comprise block-wise comparing the corresponding comparison frame with the decoded video frame based on a first block size and block-wise comparing the corresponding comparison frame with the decoded video frame based on at least one second block size, wherein each of the first block size and the at least one second block size is a different block size, and wherein the decoded video data matches the acquired video data exactly or within the acceptable threshold for the comparison if for each pixel in the acquired video frame respectively a block in the corresponding comparison frame containing the corresponding pixel corresponds to a block in the corresponding decoded video frame containing the corresponding pixel based on at least one of the block sizes.

Regarding the second and the fourth algorithm, the step of block-wise calculating an error metric for the determined error data of the corresponding block in the error frame and comparing the corresponding error metric to the predetermined threshold can comprise block-wise calculating an error metric for the determined error data of the corresponding block in the error frame and comparing the corresponding error metric to the predetermined threshold based on a first block size and block-wise calculating an error metric for the determined error data of the corresponding block in the error frame and comparing the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

Figure 2:
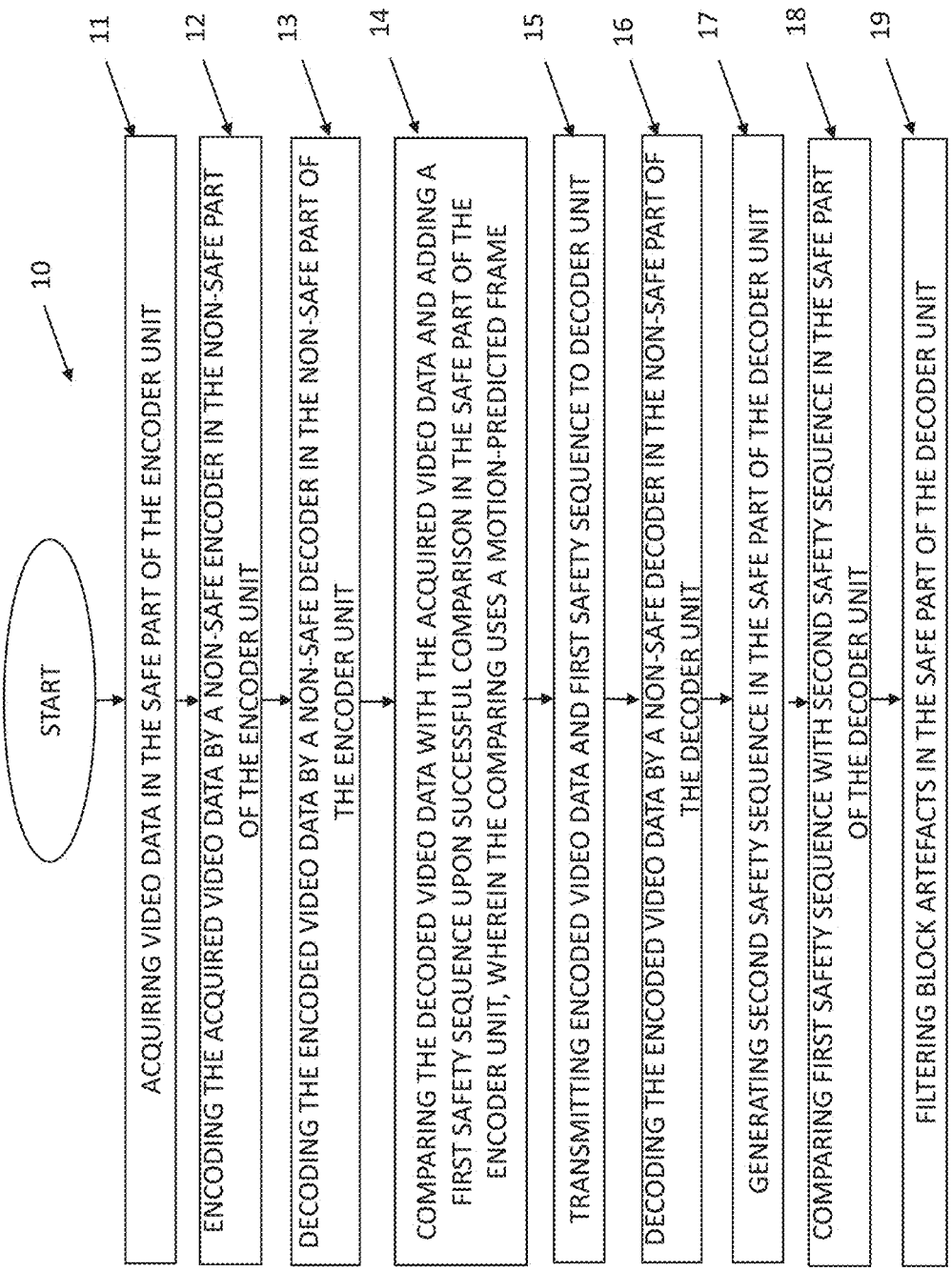
FIG. 2 illustrates a flowchart of a method for verifying video data transmitted from a source of video data to a processing unit for processing the video data according to a first embodiment.

FIG. 2 illustrates a flowchart of a method for verifying video data transmitted from a source of video data to a processing unit for processing the video data 10 according to a first embodiments.

In particular, FIG. 2 shows a method 10 for verifying video data transmitted from a source of video data to a processing unit for processing the video data by means of an encoder unit, wherein the encoder unit comprises a safe part and a non-safe part, and a decoder unit, wherein the decoder unit comprises a safe part and a non-safe part, wherein loop filtering in the encoder unit is disabled, wherein loop filtering in the decoder unit is disabled, and wherein in a first step 11 video data is acquired in the safe part of the encoder unit from the source of video data, the video data is encoded in the non-safe part of the encoder unit by a non-safe encoder in a step 12, the encoded video data is decoded by a non-safe decoder in the non-safe part of the encoder unit in a step 13 and the decoded video data is compared with the acquired video data using at least one comparison algorithm in the safe part of the encoder unit in a step 14, wherein a safety focused reaction is initiated if the decoded video data does not match the acquired video data exactly nor within an acceptable threshold for the comparison, and wherein upon successful comparison a first safety sequence is generated by the safe part of the encoder unit based on the decoded video data, wherein the encoded video data and, in case of a successful comparison, the first safety sequence are transmitted to a decoder unit for decoding the encoded video data, wherein the comparison is based on whether Rate Distortion Optimization is performed, wherein the encoded video data and the first safety sequence are transmitted to the decoder unit in a step 15, wherein the encoded video data is decoded by a non-safe decoder in the non-safe part of the decoder unit in a step 16, a second safety sequence is generated based on the decoded video data in the safe part of the decoder unit in a step 17, and the first safety sequence is compared with the second safety sequence in the safe part of the decoder unit in a step 18, wherein the correspondingly verified decoded video data is transmitted to the processing unit for further processing the video data if the first safety sequence corresponds to the second safety sequence, and wherein a second safety focused reaction is initiated if the first safety sequence does not correspond to the second safety sequence.

Thus, an improved method 10 for verifying video data transmitted from a source of video data to a processing unit for processing the video data might be provided. According to the method 10, the parts of the encoder unit and the parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded video data with the acquired video data in the encoder unit or the safe safety sequence generating unit for generating a second safety sequence for the decoded video data in the decoder unit, can be kept very simple. Therefore, the method 10 can easily be implemented, and the method 10 is configured in such a way, that video data encoded in the encoder unit can be verified in a relatively simple manner. Further, a two-step safety mechanism, in particular comparing the decoded video data with the acquired video data on the one hand and comparing a first and second safety sequence on the other hand, is provided that provides end-to-end protection for video data. Further, that loop filtering is disabled, respectively that the loop filters or deblocking filters are disabled has the additional advantage, that a source of lossy compression during the encoding, which is also a source of non-determinism, is eliminated. Further, although block artefacts are thereby made slightly more visible, especially for low quality video streams, such block artefacts are usually barely visible at all for high quality video streams.

Further, the two-step safety mechanism especially includes a video frame similarity comparison to safeguard the encoding process in the encoder unit and an additional verification using safety sequences to safeguard the decoding process in the decoder unit.

Therein, the first safety focused reaction can for example include one or more of totally stopping the streaming respectively the acquiring of video data, flagging decoded frames, respectively decoded video data that do not correspond to the corresponding input data or dropping it, or flagging individual sub-regions of a corresponding frame as invalid. In particular the first safety reaction can include flagging corresponding video frames or sub-regions of those video frames, wherein correspondingly flagged video frames or sub-regions of those video frames are transmitted to the decoder unit and blanked in the decoder unit.

Further, the second safety focused reaction can for example include one or more of not forwarding the corresponding frame, respectively data to the processing unit if the first safety sequence does not correspond to the second safety sequence, correspondingly informing the processing unit that the first safety sequence does not correspond to the second safety sequence, or flagging corresponding sub-regions of a corresponding frame as invalid, for example by blanking out invalid or corrupt sub-regions.

Therein, in step 14 the decoded video data and the acquired video data can especially be considered as being similar if a whole frame and/or all captured regions of a frame match.

According to the first embodiment, the step 14 of comparing the decoded video data with the acquired video data based on two algorithms wherein, in particular a first and a second algorithm, wherein, for each block in each video frame, only one of these two algorithms has to produce a match for the comparison to be deemed successful.

The first algorithm comprises, for each video frame in the acquired video data, respectively receiving a corresponding motion-predicted video frame from the non-safe encoder, for each video frame in the acquired video data, respectively determining residual data for the corresponding video frame based on the acquired video frame and the corresponding motion-predicted video frame, for each video frame in the acquired video frame, respectively transforming the residual data for the corresponding video frame, wherein transforming the residual data respectively includes utilizing, for example block-wise utilizing the same transformation algorithms as used in the non-safe encoder to obtain transformed residual data, quantizing the transformed residual data using the same quantization step sizes as the non-safe encoder, inverse-quantizing the quantized residual data using the same quantization step sizes as the non-safe encoder, and inverse-transforming the inverse-quantized residual data by utilizing the same inverse transformation algorithms as used in the non-safe encoder, for each video frame in the acquired video data, respectively determining a comparison frame by adding the corresponding motion-predicted video frame to the transformed, quantized, inverse-quantized and inverse-transformed residual data for the corresponding video frame, for example the transformed, quantized, inverse-quantized and inverse-transformed residual data of all blocks, and, for each video frame in the acquired video data, respectively block-wise comparing the corresponding comparison frame with the corresponding decoded video frame from the non-safe decoder, respectively the corresponding video frame as decoded by the non-safe decoder.

Thus, according to the first algorithm, the comparison is, for each video frame in the acquired video data, respectively based on a motion prediction frame, respectively on data that would represent the corresponding video frame if only motion prediction would be used in the non-safe decoder, however no transformation and quantization step. During the comparison it is then tried to repeat the encoding and decoding process of the non-safe encoder, in order to also obtain the residual data. The obtained residual data is then used to obtain a corresponding comparison frame.

Therein, for each video frame in the acquired video data, block-wise comparing the corresponding comparison frame with the decoded video frame can comprise block-wise comparing the corresponding comparison frame with the decoded video frame pixel by pixel.

The second algorithm comprises, for each video frame in the acquired video data, respectively receiving a corresponding motion-predicted video frame from the non-safe encoder, respectively, for each block of a plurality of blocks of the motion-predicted video frame, residual data for the corresponding block is respectively determined by subtracting the motion-predicted data for the corresponding block from the corresponding data in the corresponding block of the acquired video frame, an error metric, usually the sum of squared errors or the sum of absolute errors, is computed for the determined residual data of the corresponding block and the corresponding error metric is compared to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold. Therein, the predetermined threshold depends on the block size of the corresponding block.

As the block-size of the transformation in the non-safe encoder is usually not known to the corresponding safe part of the encoder unit, the corresponding block-size either has to be transmitted to the safe part of the encoder unit or the comparison in the safe part of the encoder unit has to be carried out on several different block-sizes.

According to the first embodiment, regarding the first algorithm, the step of block-wise comparing the corresponding comparison frame with the corresponding decoded video frame comprises block-wise comparing the corresponding comparison frame with the decoded video frame based on a first block size and block-wise comparing the corresponding comparison frame with the decoded video frame based on at least one second block size, wherein each of the first block size and the at least one second block size is a different block size, and wherein the decoded video data matches the acquired video data exactly for the comparison if for each pixel in the acquired video frame respectively a block in the corresponding comparison frame containing the corresponding pixel corresponds to a block in the corresponding decoded video frame containing the corresponding pixel based on at least one of the block sizes.

Regarding the second algorithm, the step of block-wise calculating an error metric for the determined error data of the corresponding block in the error frame and comparing the corresponding error metric to the predetermined threshold comprises block-wise calculating an error metric for the determined error data of the corresponding block in the error frame and comparing the corresponding error metric to the predetermined threshold based on a first block size and block-wise calculating an error metric for the determined error data of the corresponding block in the error frame and comparing the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

Therein, the comparison can for example be carried out based on blocks of a first block size of 4×4 blocks, based on blocks of a second block size of 8×8 blocks, based on blocks of a third block size of 16×16 blocks, and based on blocks of a fourth block size of 32×32 blocks, wherein, if it is assumed that a block of the decoded video data corresponds to the respective block of the acquired video data based on one of these different block sizes, it is also assumed that the decoded video data corresponds to the acquired video data for all pixels in that block, and no further computations need to be performed for any other block sizes as soon as one block size yields a successful comparison for each pixel. This is especially useful when the safe part of the encoder is realized based on Field Programmable Gate Arrays (FPGAs) and/or Application-specific integrated circuits, where comparisons in different block sizes can be performed in parallel. On the other hand, the comparisons can also be performed sequentially, for example starting with the first block size of 4×4 blocks. Using different block sizes is further necessary because codecs like for example H.265/HEVC can partition a video frame into various transformation block sizes by means of so-called quad-trees, so that each pixel in a video frame could be transformed as part of a 4×4, 8×8, 16×16 or 32×32 block.

Therein, the comparison can be done on pixels as a whole, or on individual components of a pixel, for example separately on luma and chroma components.

According to the embodiments of FIG. 2, the first safety sequence and the second safety sequence are respectively checksums or cryptographic hashes.

Therein, a checksum or a hash can be generated for each frame.

Further, the step 15 of transmitting the first safety sequence to the decoder unit comprises transmitting the first safety sequence to the decoder unit over a safety layer.

The method 10 can further comprise encrypting the communication between the encoder unit and the decoder unit, respectively encrypting the encoded video data and the first safety sequence, wherein the step 15 of transmitting the encoded video data and the first safety sequence to the decoder unit can comprise transmitting the encrypted encoded video data and the encrypted first safety sequence to the decoder unit.

Therein, the encryption can for example be based on an advanced encryption standard.

Further, the method can also comprises adding a message authentication code to the communication between the encoder unit and the decoder unit, wherein the step 15 of transmitting the encoded video data and the first safety sequence to the decoder unit comprises transmitting the encoded video data and the first safety sequence together with the message authentication code to the decoder unit.

Therein, the message authentication code can for example be a hashed message authentication code, wherein also asymmetric key algorithms are used.

The shown method 10 further comprises a step 19 of filtering block artifacts in the decoded video data in the safe part of the decoder unit if the first safety sequence corresponds to the second safety sequence, wherein the filtered decoded video data is then transmitted to the processing unit for further processing. In particular, the edges of the corresponding blocks can at least be smoothed to some extent without having to reproduce the original deblocking filter. To the contrary, a simplified filter can be utilized to only perform the edge offset filter operations, or a simplified version thereof, for example a simplified version of the H.265/HEVC deblocking filter, wherein for example the offset filter operations, for example H.265/HEVC's sample adaptive offset filter, can be omitted or modified to be simpler. Therein, known filter units, for example edge filters or offset filters, can simply be modified to work as a pure post processing step, since they do not need to be in-loop within the encoder anymore and are rather only used after decoding in the decoder.

Thus, FIG. 2 illustrates a method which is based on two units, which work together. In particular, an encoder unit acquires video data, in particular video frames and outputs an encoded bitstream together with safety integrity data for informing a decoder unit about which parts of the encoded bitstream are deemed to be safe. Further, the decoder unit receives the encoded bitstream and checks the safe integrity data provided by the encoder unit, in particular on a frame-by-frame basis.

Figure 3:
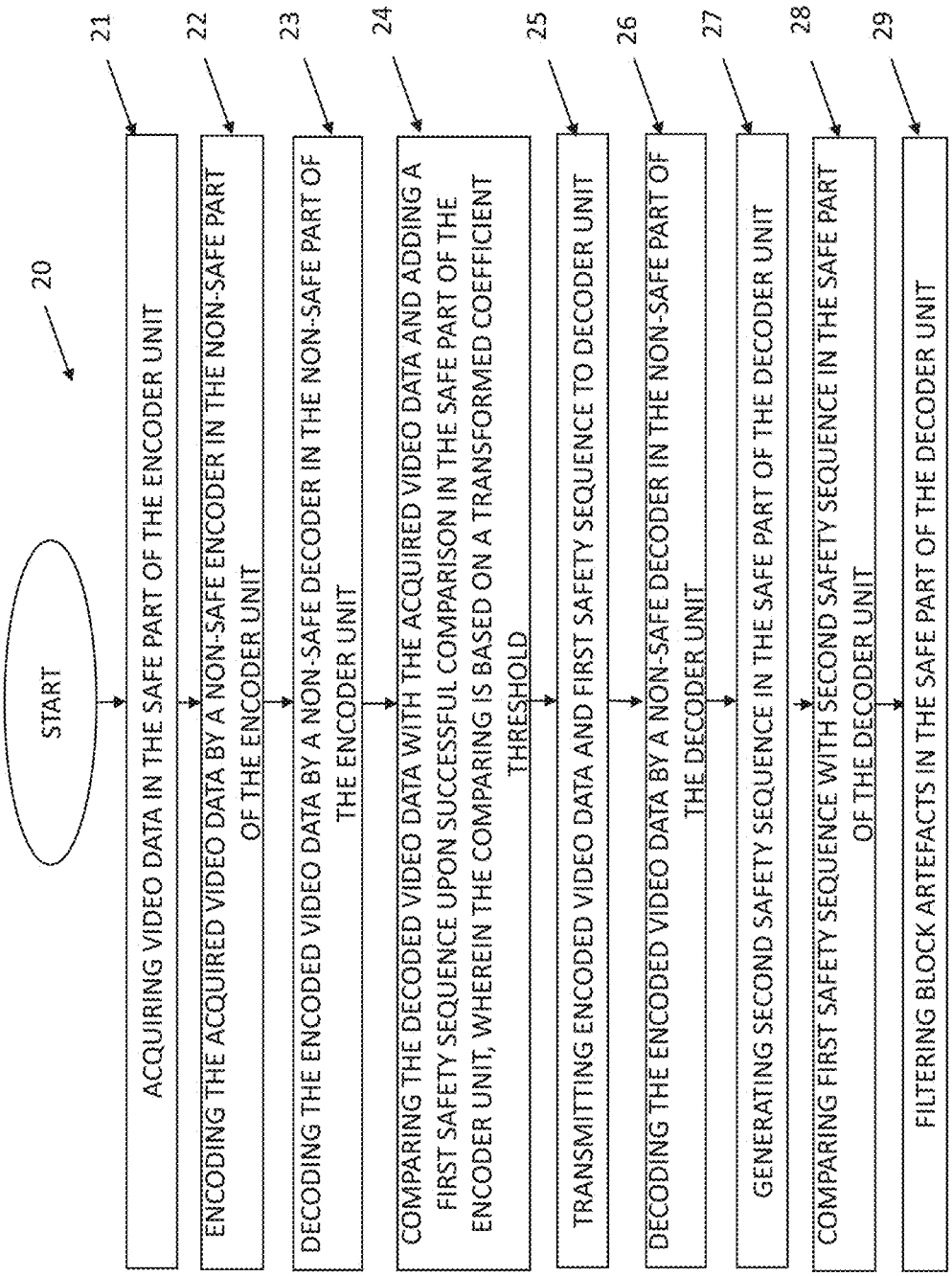
FIG. 3 illustrates a flowchart of a method for verifying video data transmitted from a source of video data to a processing unit for processing the video data according to a second embodiment.

FIG. 3 illustrates a flowchart of a method for verifying video data transmitted from a source of video data to a processing unit for processing the video data 20 according to a first embodiments.

In particular, FIG. 3 shows a method 20 for verifying video data transmitted from a source of video data to a processing unit for processing the video data by means of an encoder unit, wherein the encoder unit comprises a safe part and a non-safe part, and a decoder unit, wherein the decoder unit comprises a safe part and a non-safe part, wherein loop filtering in the encoder unit is disabled, wherein loop filtering in the decoder unit is disabled, and wherein in a first step 21 video data is acquired in the safe part of the encoder unit from the source of video data, the video data is encoded in the non-safe part of the encoder unit by a non-safe encoder in a step 22, the encoded video data is decoded by a non-safe decoder in the non-safe part of the encoder unit in a step 23 and the decoded video data is compared with the acquired video data using at least one comparison algorithm in the safe part of the encoder unit in a step 24, wherein a safety focused reaction is initiated if the decoded video data does not match the acquired video data within the acceptable threshold for the comparison, and wherein upon successful comparison a first safety sequence is generated by the safe part of the encoder unit based on the decoded video data, wherein the encoded video data and, in case of a successful comparison, the first safety sequence are transmitted to a decoder unit for decoding the encoded video data, wherein the comparison is based on whether Rate Distortion Optimization is performed, wherein the encoded video data and the first safety sequence are transmitted to the decoder unit in a step 25, wherein the encoded video data is decoded by a non-safe decoder in the non-safe part of the decoder unit in a step 26, a second safety sequence is generated based on the decoded video data in the safe part of the decoder unit in a step 27, and the first safety sequence is compared with the second safety sequence in the safe part of the decoder unit in a step 28, wherein the correspondingly verified decoded video data is transmitted to the processing unit for further processing the video data if the first safety sequence corresponds to the second safety sequence, and wherein a second safety focused reaction is initiated if the first safety sequence does not correspond to the second safety sequence.

According to the second embodiment shown in FIG. 3, the step 24 of comparing the decoded video data with the acquired video data is completely based on a quantization parameter and an RDO parameter lambda used in the non-safe encoder, wherein the step of comparing the decoded video data with the acquired video data can be based on two algorithms, in particular a third and a fourth algorithm, wherein, for each block in each video frame, only one of these two algorithms has to produce a match for the comparison to be deemed successful.

Regarding the third algorithm, the method 20 according to the second embodiment further comprises a step of, for each transformed coefficient of each transformation carried out in the non-safe encoder, computing a transformed coefficient threshold based on the quantization parameter used in the non-safe encoder, wherein the step 24 of comparing the decoded video data with the acquired video data in the safe part of the encoder unit comprises, for each video frame in the acquired video data, using the corresponding acquired video frame as a comparison frame and respectively block-wise comparing the corresponding comparison frame with the corresponding decoded video frame by dividing the corresponding decoded video frame into a plurality of blocks of pixels, for each of the plurality of blocks of pixels respectively transforming the corresponding block of pixels of the decoded video frame and a corresponding block of pixels of the corresponding comparison frame respectively using the same transformation algorithms as used in the non-safe encoder, and for each of the plurality of blocks of pixels respectively comparing the corresponding transformed block of pixels of the decoded video frame with the corresponding transformed block of pixels of the corresponding comparison frame using the quantization parameter by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients.

Therein, the numerical error depends on the used block size.

Therein, an additional error resulting from extensions to Rate Distortion Optimization like Rate Distortion Optimized Quantization or Sign Bit Hiding or both can be accounted for if such techniques are being used.

The fourth algorithm comprises, for each video frame in the acquired video data, using the corresponding decoded video frame and subtracting it from the corresponding acquired video frame to determine an error frame including error data, and respectively block-wise calculating an error metric, usually the sum of squared errors or the sum of absolute errors, for the determined error data of that block in the error frame and comparing that error metric to a predetermined threshold that is derived from the quantization parameter and the Lagrange multiplier lambda parameter in the Rate Distortion Optimization (RDO) equation as used in the non-safe encoder, wherein the comparison is deemed successful for a block if the threshold is not exceeded.

Therein, the predetermined threshold depends on the block size of the corresponding block.

Therefore, according to the second embodiment, instead of separating a pixel into the motion predicated part and the residual before the transformation, the whole matrix of pixels in a transform block is transformed not only for the original acquired video frame but also for the encoded and then decoded video frame, wherein the resulting transformation coefficients are then compared to match within a per transformation threshold that is derived from the quantization parameter used in the streamed video, wherein the comparison is done in the frequency domain.

Therein, a deterministic choice for the transformed coefficient threshold in the third algorithm can respectively be derived depending on Qstep, wherein Qstep is the corresponding quantizer step size determined by the corresponding quantization parameter. In particular, it can be defined in a first equation that a pixel of the decoded video frame corresponds to the sum of the corresponding motion predicted data and the transformed, quantized, inverse-quantized and inverse-transformed corresponding residual data. Thereafter, the first equation for this pixel, respectively the sum of the corresponding motion predicted data and the transformed, quantized, inverse-quantized and inverse-transformed corresponding residual data can be re-written, wherein, based on the linearity of the DCT/DST/Hadamard transforms, the fact that the transformation and the inverse transformation are inverse operations and the fact that during quantization followed by a successive inverse quantization a maximum error depending on Qstep is made, a part of this sum can be expressed by Qstep. For a pixel in the acquired video frame, a second equation can be defined, wherein in order to have a representation of the pixel in the second equation which is similar to that of the pixel of the decoded video frame in the first equation, the pixel is split into its corresponding motion predicted data and its corresponding residual data as for the decoded video frame, and wherein, by using the linearity of the DCT/DST/Hadamard transform, one can derive a re-written second equation for which, when subtracted from the re-written first equation, and once numerical errors due to fixed point arithmetic in coefficients and rounding has been additionally accounted for by adding the worst case errors, it can be shown that a deterministic choice for the threshold for the comparison of the transformed coefficients of the decoded video frame and the transformed coefficients of the acquired video frame could be derived depending on Qstep which in turn depends on the quantization parameter.

Further, a deterministic choice for the error metric threshold in the fourth algorithm, and also in the second algorithm described above, can respectively be derived depending on Qstep, wherein Qstep is the corresponding quantizer step size determined by the corresponding quantization parameter, and the Lagrange multiplier lambda used in the RDO equation in the non-safe encoder. This derivation can be done based on pixel patterns that maximize the bitrate by choosing pixel patterns that lead to worst case transform coefficients and their positions within the encoding scan order. Since the best encoding in an RDO sense is determined by the sum of the error metric of the encoding loss and the Lagrange multiplier lambda multiplied by the bitrate, the worst case bitrate derived from those worst case pixel patterns, multiplied by the Lagrange multiplier lambda, combined with Qstep, can then be used to derive the worst case error threshold for the error metric that could result from an RDO-based decision to skip, as opposed to encode and transmit, residual data.

Further, instead of using a fixed threshold per transformed coefficient, the thresholds can for example also be computed by summing up all of the absolute differences of the transformation coefficients between the acquired video frame and the corresponding decoded video frame and comparing the sum to a threshold.

In for example H.265/HEVC, there are modes of encoding where blocks can skip the transformation and/or quantization step. For those modes that skip the transformation step or that skip the transformation and quantization step, the corresponding pixels can further be directly compared, only accounting for numerical precision differences.

According to the second embodiment, regarding the third algorithm, the step of block-wise comparing the corresponding comparison frame with the corresponding decoded video frame comprises block-wise comparing the corresponding comparison frame with the decoded video frame based on a first block size and block-wise comparing the corresponding comparison frame with the decoded video frame based on at least one second block size, wherein each of the first block size and the at least one second block size is a different block size, and wherein the decoded video data matches the acquired video data within an acceptable threshold for the comparison if for each pixel in the acquired video frame respectively a block in the corresponding comparison frame containing the corresponding pixel corresponds to a block in the corresponding decoded video frame containing the corresponding pixel based on at least one of the block sizes.

Regarding the fourth algorithm, the step of block-wise calculating an error metric for the determined error data of the corresponding block in the error frame and comparing the corresponding error metric to the predetermined threshold comprises block-wise calculating an error metric for the determined error data of the corresponding block in the error frame and comparing the corresponding error metric to the predetermined threshold based on a first block size and block-wise calculating an error metric for the determined error data of the corresponding block in the error frame and comparing the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

Therein, the comparison can again for example be carried out based on blocks of a first block size of 4×4 blocks, based on blocks of a second block size of 8×8 blocks, based on blocks of a third block size of 16×16 blocks, and based on blocks of a fourth block size of 32×32 blocks, wherein, if it is assumed that a block of the decoded video data corresponds to the respective block of the acquired video data based on one of these different block sizes, it is also assumed that the decoded video data corresponds to the acquired video data for all pixels in that block, and no further computations need to be performed for any other block sizes as soon as one block size yields a successful comparison for each pixel.

The shown method 20 again further comprises a step 29 of filtering block artifacts in the decoded video data in the safe part of the decoder unit if the first safety sequence corresponds to the second safety sequence, wherein the filtered decoded video data is then transmitted to the processing unit for further processing.

Figure 4:
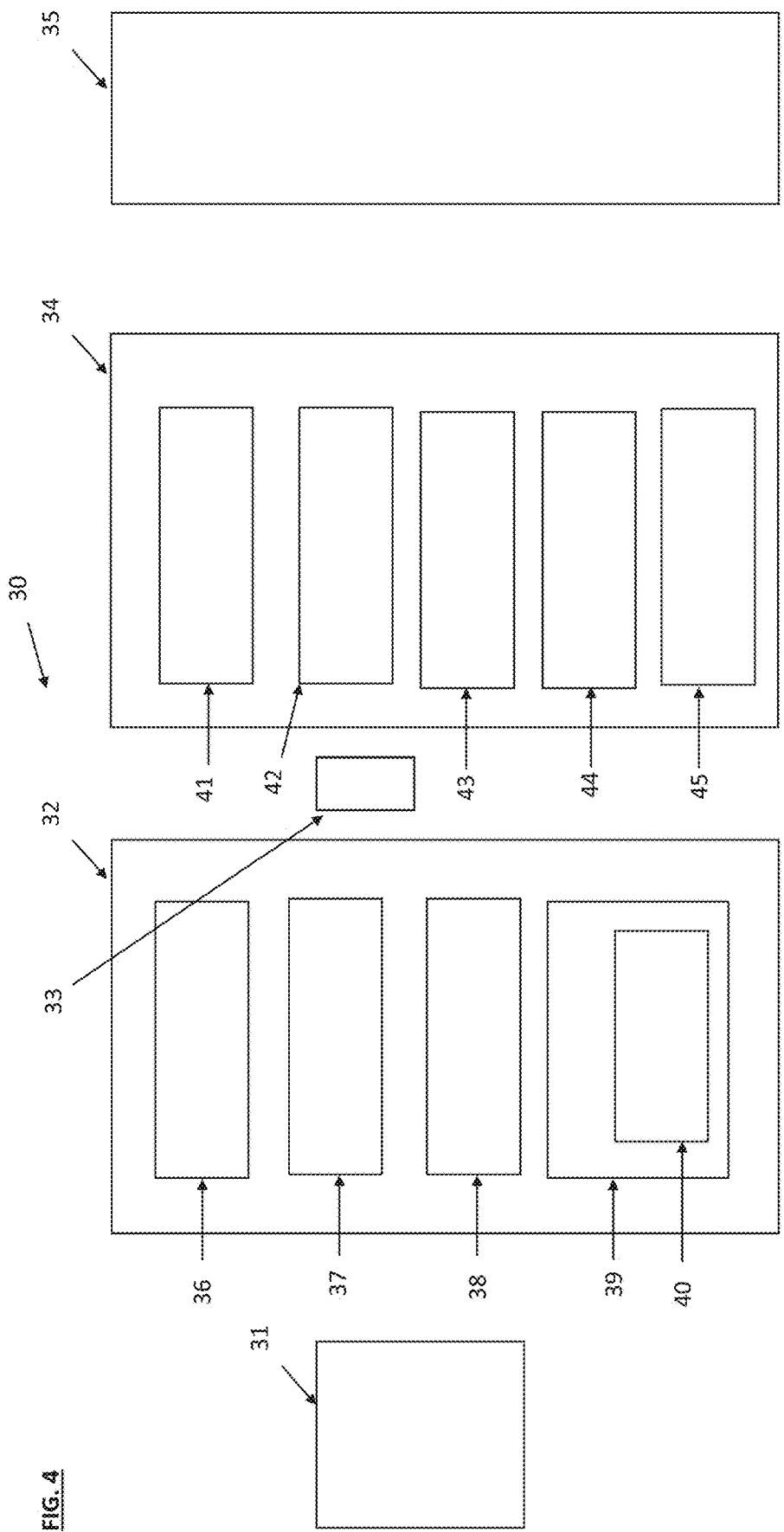
FIG. 4 illustrates a system for verifying video data transmitted from a source of video data to a processing unit for processing the video data according to embodiments of the invention.

FIG. 4 illustrates a system for verifying video data transmitted from a source of video data to a processing unit for processing the video data 30 according to embodiments of the invention.

As shown in FIG. 4, the system 30 comprises a source of video data 31 for acquiring video data, an encoder unit 32, a transmitting unit 33, a decoder unit 34, and a processing unit 35 for processing the video data outputted by the decoder unit 34, wherein the encoder unit 32 is configured to generate encoded video data and safety integrity data based on the video data acquired by the source of video data 31, wherein the transmitting unit 33 is configured to transmit the encoded video data and safety integrity data from the encoder unit 32 to the decoder unit 34, wherein the decoder unit 34 is configured to decode the encoded video data and check the safety integrity data, and wherein the processing unit 35 is configured to process the verified decoded video data.

Therein, the source of video data 31 can for example be a CMOS camera sensor or another system for providing video frames.

Further, the transmitting unit 33 can be a transmitting unit that is configured to transmit the data over a network, for example an Ethernet or a WLAN.

The processing unit 35 can further for example be a display for displaying the data, or a driver assistance system of a vehicle, respectively a function of an autonomous driving vehicle.

According to the embodiments of FIG. 4, the encoder unit 32 comprises a safe part and a non-safe part, wherein loop filtering in the encoder unit 32 is disabled. In particular, the shown encoder unit 32 comprises a safe acquiring unit 36, wherein the safe acquiring unit 36 is configured to acquire video data, a non-safe encoder 37, wherein the non-safe encoder 37 is configured to encode the acquired video data, a non-safe decoder 38, wherein the non-safe decoder 38 is configured to decode the encoded video data, and a safe comparing unit 39, wherein the safe comparing unit 39 is configured to compare the decoded video data with the acquired video data using at least one comparison algorithm, wherein the safe comparing unit 39 is configured to initiate a safety focused reaction if the decoded video data does not match the acquired video data exactly nor within an acceptable threshold for the comparison, and to generate a first safety sequence based on the decoded video data, wherein the encoded video and the first safety sequence are transmitted to a decoder unit for decoding the encoded video data, if the decoded video data matches the acquired video data exactly or within the acceptable threshold for the comparison, wherein the safe comparing unit is configured to compare the decoded video data with the acquired video data based on whether Rate Distortion Optimization is performed. Therein, safe means that the corresponding part is safety-qualified and/or has a high integrity level and non-safe means that the corresponding part is not safety critical and does not have to be safety-qualified, wherein the safety focused reaction comprises flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit, or flagging decoded video data that does not match the acquired video data exactly nor within the acceptable threshold for the comparison, respectively regions in the decoded video data that do not match the corresponding regions in the acquired video data exactly nor within the acceptable threshold for the comparison, wherein the flagged decoded video data respectively the flagged regions in the decoded video data are transmitted to the decoder unit and blanked in the decoder unit, or turning the corresponding source of video data off and/or deleting the video data acquired from the corresponding source of video data, and wherein the first safety sequence is one of a cryptographic hash, a checksum or a signature.

According to the embodiments of FIG. 4, the safe acquiring unit 36 is a safety-qualified module that acquires video data, in particular video frames from the source of video data. Therein, the safe acquiring unit can be configured to check the integrity of the source of video data 31. Such integrity checks may depend on or may even be imposed by the source of video data 31.

Further, the non-safe encoder 37, that does not need to be safety-qualified, can for example be a commercial-off-the-shelf (COTS) module or chip.

Similarly, the non-safe decoder 38, that also does not need to be safety-qualified, can for example be a commercial-off-the-shelf (COTS) module or chip.

Further, the non-safe decoder 38 could be a built-in part of the non-safe encoder 37.

The safe comparing unit 39 may further be realized by a safety-qualified software and/or hardware module.

Therein, the shown safe comparing unit 39 is configured to base the comparison on two algorithms wherein, for each block in each video frame, only one of these two algorithms has to produce a match for the comparison to be deemed successful.

The first algorithm comprises, for each video frame in the acquired video data, respectively receive a corresponding motion-predicted video frame from the non-safe encoder 37, respectively determine residual data for the corresponding video frame based on the acquired video frame and the corresponding motion-predicted video frame, and respectively block-wise transform the residual data for the corresponding video frame by utilizing the same transformation algorithms as used in the non-safe encoder 37 to obtain transformed residual data, quantizing the transformed residual data using the same quantization step sizes as the non-safe encoder 37, inverse-quantizing the quantized residual data using the same quantization step sizes as the non-safe encoder, and inverse-transforming the inverse-quantized residual data by utilizing the same inverse transformation algorithms as used in the non-safe encoder 37, wherein the safe comparing unit is further configured to, for each video frame in the acquired video data, respectively determine a comparison frame by adding the corresponding motion-predicted video frame to the block-wise inverse-transformed residual data for the corresponding video frame, and to, for each video frame in the acquired video data, respectively block-wise compare the corresponding comparison frame with the corresponding acquired video frame.

The second algorithm comprises, for each video frame in the acquired video data, respectively receiving a corresponding motion-predicted video frame including motion-predicted data from the non-safe encoder, respectively, for each block of a plurality of blocks of the motion-predicted video frame, residual data for the corresponding block is respectively determined by subtracting the motion-predicted data for the corresponding block from the corresponding data in the corresponding block of the acquired video frame, an error metric, usually the sum of squared errors or the sum of absolute errors, is computed for the determined residual data of the corresponding block and the corresponding error metric is compared to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

Therein, the corresponding threshold can be computed in a safe threshold computing unit 40, wherein the threshold may for example be realized by a safety-qualified software and/or hardware module. Further, the predetermined threshold depends on the block size of the corresponding block The shown safe comparing unit 39 is further configured to compare the decoded video data with the acquired video based on a quantization parameter and an RDO parameter lambda used in the non-safe encoder, wherein the safe comparing unit is again configured to base the comparison between the decoded video data with the acquired video data on two algorithms, in particular a third and a fourth algorithm, wherein, for each block in each video frame, only one of these two algorithms has to produce a match for the comparison to be deemed successful.

Therein, the third algorithm is configured to, for each transformed coefficient of each transformation carried out in the non-safe encoder 37, compute a transformed coefficient threshold based on the quantization parameter used in the non-safe encoder 37, and to, for each video frame in the acquired video data, use the acquired video frame as a comparison frame and respectively block-wise compare the corresponding comparison frame with the corresponding decoded video frame by dividing the corresponding decoded video frame into a plurality of blocks of pixels, for each of the plurality of blocks of pixels respectively transform the corresponding block of pixels of the decoded video frame and a corresponding block of pixels of the corresponding comparison frame respectively using the same transformations as used in the non-safe encoder 37, and for each of the plurality of blocks of pixels respectively compare the corresponding transformed block of pixels of the decoded video frame with the corresponding transformed block of pixels of the corresponding comparison frame by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients.

Therein, for each transformed coefficient of each transformation carried out in the non-safe encoder 37, the transformed coefficient threshold can again be computed in the safe threshold comparing unit 40. Further, the numerical error depends on the used block size. Further, an additional error resulting from extensions to Rate Distortion Optimization like Rate Distortion Optimized Quantization or Sign Bit Hiding or both can be accounted for if such techniques are being used.

The fourth algorithm comprises, for each video frame in the acquired video data, using the corresponding decoded video frame and subtracting it from the corresponding acquired video frame to determine an error frame including error data, and respectively block-wise calculating an error metric, usually the sum of squared errors or the sum of absolute errors, for the determined error data of the corresponding block in the error frame and comparing the corresponding error metric to a predetermined threshold that is derived from the quantization parameter and the Lagrange multiplier lambda parameter in the Rate Distortion Optimization (RDO) equation as used in the non-safe encoder, wherein the comparison is deemed successful for the corresponding block if the corresponding error metric does not exceed the predetermined threshold.

Therein, for each video frame in the acquired video data, the corresponding threshold can again be computed in the safe threshold comparing unit 40. Further, the predetermined threshold depends on the block size of the corresponding block Regarding the first and the third algorithm, the safe comparing unit 39 is further configured to block-wise compare the corresponding comparison frame with the corresponding decoded video frame based on a first block size and to block-wise compare the corresponding comparison frame with the corresponding decoded video frame based on at least one second block size, wherein each of the first block size and the at least one second block size is a different block size, wherein the decoded video data matches the acquired video data exactly or within the acceptable threshold for the comparison if for each pixel in the acquired video frame respectively a block in the corresponding comparison frame containing the corresponding pixel corresponds to a block in the corresponding decoded video frame containing the corresponding pixel based on at least one of the block sizes.

Regarding the second and the fourth algorithm, the safe comparing unit 39 is configured to block-wise calculate an error metric for the determined error data of the corresponding block in the error frame and compare the corresponding error metric to the predetermined threshold based on a first block size and to block-wise calculate an error metric for the determined error data of the corresponding block in the error frame and compare the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

The shown encoder unit 32 further comprises a safety layer module, respectively a safety-qualified module that is configured to transmit the first safety sequence, for example the generated checksum or hash, via a safety layer. Safety layers are a standard technique in safety systems used for data transmission of safety critical data. The safety layer appropriately addresses threats like repetition, deletion, insertion, re-sequencing, corruption, delay and others during the transmission of safety critical data. It makes sure that the data transmitted can be checked not to be outdated/stale or out of sequence, and that the data has the necessary integrity for the safety level required.

The encoder unit may further comprise a safe color space conversion unit that is configured to transform the video data acquired by the source of video data respectively the safe acquiring unit in a color space suitable for use by the non-safe encoder.

Therein, the first safety reaction can for example include flagging corresponding video frames or sub-regions of those video frames, wherein the encoder unit 32 can be configured to transmit correspondingly flagged video frames or sub-regions of these video frames to the decoder unit 34, wherein these frames or sub-regions are blanked in the decoder unit 34.

The shown decoder unit 34 comprises a safe part and a non-safe part, wherein loop filtering in the encoder unit 32 is disabled, and wherein the shown decoder unit 34 comprises a receiver 41 to receive encoded video data and, in case of a successful verification in the encoder unit, that have been transmitted to the decoder unit 34 by a corresponding transmitter of the encoder unit 32, wherein the encoded video data and the first safety sequence have been generated by the encoder unit 32, wherein the shown decoder unit 34 further comprises a non-safe decoder 42, wherein the non-safe decoder 42 is configured to decode the encoded video data, a safe safety sequence generating unit 43, wherein the safe safety sequence generating unit 43 is configured to generate a second safety sequence based on the decoded video data, and a safe safety sequence matching unit 44, wherein the safe safety sequence matching unit 44 is configured to compare the first safety sequence with second safety sequence, wherein the safe safety sequence matching unit 44 is configured to allow transmission of the verified decoded video data to the processing unit 35 for further processing the video data if the first safety sequence corresponds to the second safety sequence, and to initiate a safety focused reaction if the first safety sequence does not correspond to the second safety sequence.

Therein, the receiver 41 does not need to be safety-qualified and can be realized based on a commercial-off-the-shelf solution, for example a streamer library and standard Linux libraries.

Further, the non-safe decoder 42, that does not need to be safety-qualified, can again for example be a commercial-off-the-shelf (COTS) module or chip, wherein a different non-safe decoder can be used if it produces the same results as the non-safe decoder 38 of the encoder unit (as it should according to e.g. the H.264/AVC or H.265/HEVC standards if it is a standards-compliant decoder), or wherein the non-safe decoder 42 can correspond to the non-safe decoder 38 of the encoder unit 32.

The safe safety sequence generating unit 43 and the safe safety sequence matching unit 44 may further respectively be realized by a safety-qualified software and/or hardware module.

According to the embodiments of FIG. 4, the decoder unit 34 further comprises a safe filter unit 45 in the safe part of the decoder unit 34, wherein the safe filter unit 45 is configured to filter block artifacts in the decoded video data if the first safety sequence corresponds to the second safety sequence.

The decoder unit 34 further comprises a safety layer module, respectively a safety-qualified module that is configured to receive the first safety sequence, for example the generated checksum or hash, via a safety layer. Therein, also information regarding flagged frames or sub-regions is usually transmitted over the safety layer. Safety layers are a standard technique in safety systems used for data transmission of safety critical data. The safety layer appropriately addresses threats like repetition, deletion, insertion, re-sequencing, corruption, delay and others during the transmission of safety critical data. It makes sure that the data transmitted can be checked not to be outdated/stale or out of sequence, and that the data has the necessary integrity for the safety level required.

The decoder unit may further comprise a safe color space conversion unit that is configured to transform the video data decoded in the decoder unit in a color space suitable for use by the processing unit.

Further, the decoder unit 34 can for example be configured to blank out invalid or corrupt sub-regions.

The system can further comprise an encrypting unit in the encoder unit and a decrypting unit in the decoder unit, wherein the encrypting unit is configured to encrypt the encoded video data and the first safety sequence, wherein the transmitting unit is configured to transmit the encrypted encoded video data and the encrypted first safety sequence to the decoder unit, where the safe decrypting unit decrypts the encrypted encoded video data and the encrypted first safety sequence.

Also the system can further comprise an adding unit in the encoder unit and a removing unit in the decoder unit, wherein the adding unit is configured to add a message authentication code to the encoded video data and the first safety sequence, wherein the transmitting unit is configured to transmit the encoded video data and the first safety sequence together with the message authentication code to the decoder unit, wherein the removing unit in the decoder unit is configured to check the message authentication code to determine the integrity of the encoded video data and the first safety sequence. The message authentication code can also be signed with an asymmetric key algorithm, and the signature can be transmitted alongside with the message authentication code.

Therein, the encrypting unit, the decrypting unit, the adding unit and the removing unit can for example respectively be realized in hardware such as an FPGA.

Further, the units of the encoder unit and/or the units of the decoder unit can respectively be integrated in one hardware unit respectively device. However, the encoder unit can for example also consist of a separate non-safe hardware unit, on which for example the non-safe encoder of the encoder unit can be arranged, and a separate safe hardware unit, on which for example the safe comparing module of the encoder unit can be arranged. Similarly, the decoder unit can also consist of a separate non-safe hardware unit, on which for example the non-safe decoder of the decoder unit can be arranged, and a separate safe hardware unit, on which for example the safe safety sequence generating unit and the safe safety sequence matching unit of the decoder unit can be arranged. Therein, the safe hardware units can be added to existing non-safe hardware units to upgrade the existing non-safe hardware units with safety functionality.

The shown encoder unit 32 is further configured to execute a method for verifying video data encoded in an encoder unit as described above, and the shown system 30 is configured to execute a method for verifying video data transmitted from a source of video data to a processing unit for processing the video data as described above.

The invention claimed is:

1. A method for verifying video data encoded in an encoder unit, wherein the encoder unit comprises a safe part and a non-safe part, wherein the safe part is safety-qualified according to a desired safety standard, wherein loop filtering in the encoder unit is disabled, the method comprising the steps of:
(a) acquiring video data with a safe acquiring unit in the safe part of the encoder unit;
(b) encoding the acquired video data with a non-safe encoder in the non-safe part of the encoder unit;
(c) decoding the encoded video data with a non-safe decoder in the non-safe part of the encoder unit; and
(d) comparing the decoded video data with the acquired video data with a safe comparing unit in the safe part of the encoder unit using at least one comparison algorithm,
wherein the step of comparing the decoded video data with the acquired video data comprises the step of computing a threshold for the comparison in a safe threshold computing unit comprised in the encoder unit,
wherein the safe part of the encoder unit, comprising the safe acquiring unit, the safe comparing unit, and the safe threshold computing unit, enables the non-safe part of the encoder unit, comprising the non-safe encoder and the non-safe decoder, to operate safely according to the safety standard,
wherein the step of comparing the decoded video data with the acquired video data is based on whether Rate Distortion Optimization is performed, wherein different algorithms are used for comparing the decoded video data with the acquired video data if Rate Distortion Optimization is performed than if Rate Distortion Optimization is not performed,
wherein:
if the decoded video data matches the acquired video data exactly or within the threshold for the comparison a first safety sequence is generated with the safe comparing unit based on the decoded video data in the safe part of the encoder unit, and the encoded video data and the first safety sequence are transmitted to a decoder unit, which is external to the encoder unit, for decoding the encoded video data, wherein the first safety sequence is one of a cryptographic hash, a checksum or a signature, and
if the decoded video data does not match the acquired video data exactly nor within the threshold for the comparison a safety focused reaction is initiated, wherein the safety focused reaction comprises:
(i) flagging decoded video data that does not match the acquired video data exactly nor within the threshold for the comparison, which includes flagging corresponding video frames or sub-regions of the video frames, wherein the correspondingly flagged video frames or sub-regions of the video frames are transmitted to the decoder unit, or
(ii) flagging decoded video data that does not match the acquired video data exactly nor within the threshold for the comparison, which includes flagging corresponding video frames or sub-regions of the video frames, wherein the correspondingly flagged video frames or sub-regions of the video frames are transmitted to the decoder unit and blanked in the decoder unit, or (iii) turning the corresponding source of video data off.

2. The method of claim 1, wherein the step of comparing the decoded video data with the acquired video data, according to one of the algorithms to be used if Rate Distortion Optimization is not performed, comprises the steps of:

for each video frame in the acquired video data, respectively receiving a corresponding motion-predicted video frame from the non-safe encoder;

for each video frame in the acquired video data, respectively determining residual data for the corresponding video frame based on the acquired video frame and the corresponding motion-predicted video frame;

for each video frame in the acquired video frame, respectively block-wise transforming the residual data for the corresponding video frame, wherein transforming the residual data respectively includes utilizing transformation algorithms as used in the non-safe encoder to obtain transformed residual data, quantizing the transformed residual data using quantization step sizes as used in the non-safe encoder, inverse-quantizing the quantized residual data using quantization step sizes as used in the non-safe encoder, and inverse-transforming the inverse-quantized residual data by utilizing inverse transformation algorithms as used in the non-safe encoder;

for each video frame in the acquired video data, respectively determining a comparison frame by adding the corresponding motion-predicted video frame to the block-wise inverse-transformed residual data for the corresponding video frame; and for each video frame in the acquired video data, respectively block-wise comparing the corresponding comparison frame with the corresponding decoded video frame.

3. The method of claim 1, wherein the step of comparing the decoded video data with the acquired video data, according to one of the algorithms to be used if Rate Distortion Optimization is performed, comprises:

for each video frame in the acquired video data, respectively receiving a corresponding motion-predicted video frame including motion-predicted data from the non-safe encoder;

for each block of a plurality of blocks of the motion-predicted video frame, respectively determining residual data for the corresponding block by subtracting the motion-predicted data for the corresponding block from the corresponding data in the corresponding block of the acquired video frame, calculating an error metric for the determined residual data of the corresponding block and comparing the error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

4. The method of claim 1, wherein the method further comprises, for each transformed coefficient of each transformation carried out in the non-safe encoder, respectively computing a transformed coefficient threshold based on the quantization parameter used in the non-safe encoder, wherein the step of comparing the decoded video data with the acquired video data, according to one of the algorithms to be used if Rate Distortion Optimization is not performed, comprises, for each video frame in the acquired video data, using the corresponding acquired video frame as a comparison frame and respectively block-wise comparing the corresponding comparison frame with the corresponding decoded video frame by dividing the corresponding decoded video frame into a plurality of blocks of pixels, for each of the plurality of blocks of pixels respectively transforming the corresponding block of pixels in the decoded video frame and a corresponding block of pixels of the corresponding comparison frame respectively using transformations as used in the non-safe encoder, and for each of the plurality of blocks of pixels respectively comparing the corresponding transformed block of pixels in the decoded video frame with the corresponding transformed block of pixels of the corresponding comparison frame by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients.

5. The method of claim 1, wherein the step of comparing the decoded video data with the acquired video data, according to one of the algorithms to be used if Rate Distortion Optimization is not performed, comprises, for each video frame in the acquired video data, using the corresponding decoded video frame and subtracting the corresponding decoded video frame from the corresponding acquired video frame to determine an error frame including error data, block-wise calculating an error metric for the determined error data of the corresponding block in the error frame and comparing the corresponding error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

6. The method of claim 2, wherein the step of block-wise comparing the corresponding comparison frame with the corresponding decoded video frame comprises block-wise comparing the corresponding comparison frame with the decoded video frame based on a first block size and block-wise comparing the corresponding comparison frame with the decoded video frame based on at least one second block size, wherein each of the first block size and the at least one second block size is a different block size, and wherein the decoded video data matches the acquired video data exactly or within the threshold for the comparison if for each pixel in the acquired video data respectively a block in the corresponding comparison frame containing the corresponding pixel matches a corresponding block in the corresponding decoded video frame containing the corresponding pixel based on at least one of the different block sizes.

7. The method of claim 3, wherein the step of block-wise calculating an error metric for the determined error data of the corresponding block in the error frame and comparing the corresponding error metric to the predetermined threshold comprises block-wise calculating an error metric for the determined error data of the corresponding block in the error frame and comparing the corresponding error metric to the predetermined threshold based on a first block size and block-wise calculating an error metric for the determined error data of the corresponding block in the error frame and comparing the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

8. A method for verifying video data transmitted from a source of video data to a processing unit for processing the video data with an encoder unit and a decoder unit, which is external to the encoder unit, wherein the encoder unit comprises a safe part and a non-safe part, and wherein the decoder unit comprises a safe part and a non-safe part, wherein the safe part is safety-qualified according to a desired safety standard, wherein loop filtering in the encoder unit is disabled, wherein loop filtering in the decoder unit is disabled, and wherein the method comprises the steps of:
(a) acquiring video data from the source of video data with a safe acquiring unit in the safe part of the encoder unit;
(b) encoding the video data in the non-safe part of the encoder unit;
(c) decoding the encoded video data with a non-safe decoder in the non-safe part of the encoder unit; and
(d) verifying the video data encoded in the encoder unit by a method for verifying video data encoded in an encoder unit according to claim 1;
(e) transmitting the encoded video data and a corresponding first safety sequence to the decoder unit;
(f) decoding the encoded video data with a non-safe decoder in the non-safe part of the decoder unit;
(g) generating a second safety sequence based on the decoded video data with a safe safety sequence generating unit in the safe part of the decoder unit; and
(h) comparing the first safety sequence with the second safety sequence with a safe safety sequence matching unit in the safe part of the decoder unit wherein the decoded video data is transmitted to the processing unit for further processing the decoded video data if the first safety sequence corresponds to the second safety sequence, and wherein a safety focused reaction is initiated if the first safety sequence does not correspond to the second safety sequence, wherein the second safety sequence is one of a cryptographic hash, a checksum or a signature.

9. The method of claim 8, wherein the method further comprises filtering block artifacts of the decoded video data in the safe part of the decoder unit if the first safety sequence corresponds to the second safety sequence, wherein the filtered decoded video data is transmitted to the processing unit for further processing.

10. The method of claim 8, wherein the step of transmitting the first safety sequence to the decoder unit comprises transmitting the first safety sequence to the decoder unit over a safety layer.

11. An encoder unit, wherein the encoder unit comprises a safe part and a non-safe part, wherein the safe part is safety-qualified according to a desired safety standard, wherein loop filtering in the encoder unit is disabled, and wherein the encoder unit comprises:
a safe acquiring unit in the safe part of the encoder unit, wherein the safe acquiring unit is configured to acquire video data,
a non-safe encoder in the non-safe part of the encoder unit, wherein the non-safe encoder is configured to encode acquired video data,
a non-safe decoder in the non-safe part of the encoder unit, wherein the non-safe decoder is configured to decode the encoded video data,
and a safe comparing unit in the safe part of the encoder unit, wherein the safe comparing unit is configured to compare the decoded video data with the acquired video data using at least one comparison algorithm,
wherein the encoder unit comprises a safe threshold computing unit, wherein the safe threshold computing unit is configured to compute a threshold for the comparison,
wherein the safe part of the encoder unit, comprising the safe acquiring unit, the safe comparing unit, and the safe threshold computing unit, enables the non-safe part of the encoder unit, comprising the non-safe encoder and the non-safe decoder, to operate safely according to the safety standard,
wherein the step of comparing the decoded video data with the acquired video data is based on whether Rate Distortion Optimization is performed, wherein different algorithms are used for comparing the decoded video data with the acquired video data if Rate Distortion Optimization is performed than if Rate Distortion Optimization is not performed,
wherein:
if the decoded video data matches the acquired video data exactly or within the threshold for the comparison a first safety sequence is generated in the safe comparing unit based on the decoded video data in the safe part of the encoder unit, and the encoded video data and the first safety sequence are transmitted to a decoder unit, which is external to the encoder unit, for decoding the encoded video data, wherein the first safety sequence is one of a cryptographic hash, a checksum or a signature, and
if the decoded video data does not match the acquired video data exactly nor within the threshold for the comparison a safety focused reaction is initiated, wherein the safety focused reaction comprises:
(i) flagging decoded video data that does not match the acquired video data exactly nor within the threshold for the comparison, which includes flagging corresponding video frames or sub-regions of the video frames, wherein the correspondingly flagged video frames or sub-regions of the video frames are transmitted to the decoder unit, or
(ii) flagging decoded video data that does not match the acquired video data exactly nor within the threshold for the comparison, which includes flagging corresponding video frames or sub-regions of the video frames, wherein the correspondingly flagged video frames or sub-regions of the video frames are transmitted to the decoder unit and blanked in the decoder unit, or
(iii) turning the corresponding source of video data off.

12. The encoder unit of claim 11, wherein the safe comparing unit is configured, according to one of the algorithms to be used if Rate Distortion Optimization is not performed, to, for each video frame in the acquired video data, respectively receive a corresponding motion-predicted video frame from the non-safe encoder, respectively determine residual data for the corresponding video frame based on the acquired video frame and the corresponding motion-predicted video frame, and respectively block-wise transform the residual data for the corresponding video frame by utilizing transformation algorithms as used in the non-safe encoder to obtain transformed residual data, quantizing the transformed residual data using quantization step sizes as used in the non-safe encoder, inverse-quantizing the quantized residual data using quantization step sizes as used in the non-safe encoder, and inverse-transforming the inverse-quantized residual data by utilizing inverse transformation algorithms as used in the non-safe encoder, wherein the safe comparing unit is further configured to, for each video frame in the acquired video data, respectively determine a comparison frame by adding the corresponding motion-predicted video frame to the block-wise inverse-transformed residual data for the corresponding video frame, and to, for each video frame in the acquired video data, respectively block-wise compare the corresponding comparison frame with the corresponding acquired video frame.

13. The encoder unit of claim 11, wherein the safe comparing unit is configured, according to one of the algorithms to be used if Rate Distortion Optimization is performed, to, for each video frame in the acquired video data, respectively receive a corresponding motion-predicted video frame including motion-predicted data from the non-safe encoder, respectively, for each block of a plurality of blocks of the motion-predicted video frame, respectively determine residual data for the corresponding block by subtracting the motion-predicted data for the corresponding block from the corresponding data in the corresponding block of the acquired video frame, calculate an error metric for the determined residual data of the corresponding block and compare the error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

14. The encoder unit of claim 11, wherein the safe comparing unit is configured to, according to one of the algorithms to be used if Rate Distortion Optimization is performed, for each transformed coefficient of each transformation carried out in the non-safe encoder, compute a transformed coefficient threshold based on the quantization parameter used in the non-safe encoder, and to, for each video frame in the acquired video data, use the corresponding acquired video frame as a comparison frame and respectively block-wise compare the corresponding comparison frame with the corresponding decoded video frame by dividing the corresponding decoded video frame into a plurality of blocks of pixels, for each of the plurality of blocks of pixels respectively transform the corresponding block of pixels of the decoded video frame and a corresponding block of pixels of the corresponding comparison frame respectively using transformations as used in the non-safe encoder, and for each of the plurality of blocks of pixels respectively compare the corresponding transformed block of pixels of the decoded video frame with the corresponding transformed block of pixels of the corresponding comparison frame by comparing the transformed coefficients of the transformation of the corresponding block of pixels of the decoded video frame with the transformed coefficients of the transformation of the corresponding block of pixels of the corresponding comparison frame using the transformed coefficient thresholds and accounting for numerical errors due to fixed point arithmetic in coefficients and rounding on all transformed coefficients.

15. The encoder unit of claim 11, wherein the safe comparing unit is configured to, according to one of the algorithms to be used if Rate Distortion Optimization is performed, for each video frame in the acquired video data, use the corresponding decoded video frame and subtracting the corresponding decoded video frame from the corresponding acquired video frame to determine an error frame including error data, block-wise calculate an error metric for the determined error data of the corresponding block in the error frame and compare the error metric to a predetermined threshold that is derived from the quantization parameter and the Lagrange multiplier lambda parameter in the Rate Distortion Optimization equation as used in the non-safe encoder, wherein the comparison is deemed successful for the corresponding block if the corresponding error metric does not exceed the predetermined threshold.

16. The encoder unit of claim 12, wherein the safe comparing unit is further configured to block-wise compare the corresponding comparison frame with the corresponding decoded video frame based on a first block size and to block-wise compare the corresponding comparison frame with the corresponding decoded video frame based on at least one second block size, wherein each of the first block size and the at least one second block size is a different block size, and wherein the decoded video data matches the acquired video data exactly or within the threshold for the comparison if for each pixel in the acquired video frame respectively a block in the corresponding comparison frame containing the corresponding pixel corresponds to a corresponding block in the corresponding decoded video frame containing the corresponding pixel based on at least one of the different block sizes.

17. The encoder unit of claim 13, wherein the safe comparing unit is configured to block-wise calculate an error metric for the determined error data of the corresponding block in the error frame and compare the corresponding error metric to the predetermined threshold based on a first block size and to block-wise calculate an error metric for the determined error data of the corresponding block in the error frame and compare the corresponding error metric to the predetermined threshold based on at least one second block size, wherein each of the first block size and the at least one second block size is a different block size, and wherein the comparison is deemed successful if for each pixel in the error frame the error metric does not exceeded the predetermined threshold for a block containing the corresponding pixel based on at least one of the different block sizes.

18. A decoder unit, wherein the decoder unit comprises a safe part and a non-safe part, wherein the safe part is safety-qualified according to a desired safety standard, wherein loop filtering in the decoder unit is disabled, and wherein the decoder unit comprises:
 a receiver to receive encoded video data, wherein the encoded video data has been verified in an encoder unit, which is external to the decoder unit, according to claim 11, and a corresponding first safety sequence that has been generated in the encoder unit in case of successful verification of the encoded video data,
 a non-safe decoder in the non-safe part of the decoder unit, wherein the non-safe decoder is configured to decode the encoded video data,
 a safe safety sequence generating unit in the safe part of the decoder unit, wherein the safe safety sequence generating unit is configured to generate a second safety sequence based on the decoded video data, and
 a safe safety sequence matching unit in the safe part of the decoder unit, wherein the safe safety sequence matching unit (44) is configured to compare the first safety sequence with the second safety sequence, wherein the safe safety sequence matching unit is configured to allow transmission of the decoded video data to a processing unit for further processing the video data if the first safety sequence corresponds to the second safety sequence, and to initiate a safety focused reaction if the first safety sequence does not correspond to the second safety sequence, wherein the second safety sequence is one of a cryptographic hash, a checksum or a signature.

19. The decoder unit according of claim 18, wherein the decoder unit further comprises a safe filter unit in the safe part of the decoder unit, wherein the safe filter unit is configured to filter block artifacts in the decoded video data if the first safety sequence corresponds to the second safety sequence.

20. A system for verifying video data transmitted from a source of video data to a processing unit for processing the video data, wherein the system comprises the source of video data for acquiring video data, an encoder unit according to claim 11, a transmitting unit, a decoder unit, and a processing unit for processing the acquired video data, wherein the encoder unit is configured to generate encoded video data acquired from the source of video data, wherein the transmitting unit is configured to transmit the encoded video data from the encoder unit to the decoder unit, wherein the decoder unit is configured to decode the encoded video data, and wherein the processing unit is configured to process the decoded video data.

* * * * *